United States Patent
Matsumura et al.

(10) Patent No.: US 11,457,451 B2
(45) Date of Patent: Sep. 27, 2022

(54) TERMINAL AND RADIO COMMUNICATION METHOD FOR TRANSMISSION OF A CONTROL CHANNEL OR REFERENCE SIGNAL

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 16 days.

(21) Appl. No.: 16/764,704

(22) PCT Filed: Nov. 17, 2017

(86) PCT No.: PCT/JP2017/041572
§ 371 (c)(1),
(2) Date: May 15, 2020

(87) PCT Pub. No.: WO2019/097703
PCT Pub. Date: May 23, 2019

(65) Prior Publication Data
US 2021/0176756 A1    Jun. 10, 2021

(51) Int. Cl.
*H04W 72/04*  (2009.01)
*H04L 5/00*   (2006.01)

(52) U.S. Cl.
CPC ....... *H04W 72/0493* (2013.01); *H04L 5/0012* (2013.01); *H04L 5/0048* (2013.01); *H04W 72/0413* (2013.01); *H04W 72/0446* (2013.01)

(58) Field of Classification Search
CPC ......... H04W 72/0493; H04W 72/0413; H04W 72/0446; H04L 5/0012; H04L 5/0048;
(Continued)

(56) References Cited

U.S. PATENT DOCUMENTS

2012/0140717 A1   6/2012  Zhu et al.
2013/0022087 A1*  1/2013  Chen ................. H04L 27/2613
                                                              375/147

(Continued)

FOREIGN PATENT DOCUMENTS

CN    101645868 A    2/2010
CN    102696193 A    9/2012

(Continued)

OTHER PUBLICATIONS

International Search Report issued in Application No. PCT/JP2017/041572, dated Feb. 13, 2018 (3 pages).

(Continued)

*Primary Examiner* — Tejis Daya
(74) *Attorney, Agent, or Firm* — Osha Bergman Watanabe & Burton LLP

(57) ABSTRACT

The present invention is designed to appropriately configure sequences that are applied to reference signals and/or uplink control channels and so on in future radio communication systems. One aspect of the user terminal of the present invention provides a transmitting section that transmits a demodulation reference signal and/or an uplink control channel, to which predetermined sequences are applied, in predetermined slots, and a control section that controls each predetermined sequence that is used in the predetermined slots based on whether or not frequency hopping is used in the predetermined slots.

19 Claims, 20 Drawing Sheets

| LONG-PUCCH DURATION N | OCC MULTIPLEXING CAPACITY M | |
|---|---|---|
| | HOPPING IS USED | HOPPING IS NOT USED |
| 4 | 1 | 2 |
| 5 | 1 | 2 |
| 6 | 1 | 3 |
| 7 | 1 | 3 |
| 8 | 2 | 4 |
| 9 | 2 | 4 |
| 10 | 2 | 5 |
| 11 | 2 | 5 |
| 12 | 3 | 6 |
| 13 | 3 | 6 |
| 14 | 3 | 7 |

(58) Field of Classification Search
CPC ..... H04L 5/0051; H04L 5/0053; H04B 1/715; H04B 1/7143

See application file for complete search history.

(56) References Cited

U.S. PATENT DOCUMENTS

| | | | | |
|---|---|---|---|---|
| 2013/0083683 | A1* | 4/2013 | Hwang | H04L 43/08 370/252 |
| 2013/0329660 | A1* | 12/2013 | Noh | H04L 27/2613 370/329 |
| 2014/0204885 | A1* | 7/2014 | Qu | H04L 5/0023 370/329 |
| 2014/0334400 | A1* | 11/2014 | Chen | H04W 72/005 370/329 |
| 2015/0373626 | A1* | 12/2015 | Yi | H04W 24/08 375/132 |
| 2016/0087709 | A1* | 3/2016 | Horiuchi | H04B 7/068 375/260 |
| 2016/0191220 | A1* | 6/2016 | Noh | H04W 72/04 370/329 |
| 2016/0352488 | A1 | 12/2016 | Noh et al. | |
| 2017/0033908 | A1 | 2/2017 | Hwang et al. | |
| 2017/0149593 | A1 | 5/2017 | Ko et al. | |
| 2018/0324777 | A1* | 11/2018 | Wang | H04L 5/0092 |
| 2019/0280734 | A1* | 9/2019 | Park | H04B 1/7143 |
| 2020/0014515 | A1* | 1/2020 | Qin | H04L 27/2613 |

FOREIGN PATENT DOCUMENTS

| | | |
|---|---|---|
| CN | 106233658 A | 12/2016 |
| CN | 110383923 A | 10/2019 |
| EP | 2 523 378 A2 | 11/2012 |
| EP | 3 582 566 A1 | 12/2019 |
| WO | WO-2020200108 A1 * | 10/2020 |

OTHER PUBLICATIONS

Written Opinion issued in International Application No. PCT/JP2017/041572, dated Feb. 13, 2018 (4 pages).

3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).

3GPP TSG RAN WG1 Meeting 90bis; R1-1718562; "Long PUCCH design with 1 or 2 bits UCI payload;" Qualcomm Incorporated; Oct. 9-13, 2017; Prague, Czech Republic (10 pages).

3GPP TSG RAN WG1 Meeting 90bis; R1-1718448; "Remaining details on DMRS design;" Ericsson; Oct. 9-13, 2017; Prague, Czech Republic (11 pages).

3GPP TS 36.211 V14.0.0, Release 14; "3rd Generation Partnership Project; Technical Specification Group Radio Access Network; Evolved Universal Terrestrial Radio Access (E-UTRA); Physical channels and modulation;" Sep. 2016 (6 pages).

Partial Supplementary European Search Report in counterpart European Application No. 17 931 976.9 dated Jun. 23, 2021 (15 pages).

LG Electronics; "Design of short PUCCH for UCI of up to 2 bits for NR"; 3GPP TSG RAN WG1 Meeting 90bis, R1-1717956; Prague, CZ; Oct. 9-13, 2017 (7 pages).

Vivo; "Support of short-PUCCH over 2 OFDM symbols"; 3GPP TSG RAN WG1 Meeting 90bis, R1-1717491; Prague, CZ; Oct. 9-13, 2017 (4 pages).

Extended European Search Report issued in Application No. 17931976.9 dated Sep. 24, 2021 (13 pages).

Office Action issued in counterpart Chinese Application No. 201780098191.1 dated Jun. 29, 2021 (19 pages).

Office Action in counterpart Japanese Patent Application No. 2019-553653 dated Feb. 1, 2022 (12 pages).

Office Action in counterpart Chinese Patent Application No. 201780098191.1 dated Feb. 23, 2022 (15 pages).

* cited by examiner

| PUCCH FORMAT | A NUMBER OF SYMBOLS | A NUMBER OF BITS |
|---|---|---|
| 0 | 1-2 | $\leq 2$ |
| 1 | 4-14 | $\leq 2$ |
| 2 | 1-2 | $>2$ |
| 3 | 4-14 | $>N$ |
| 4 | 4-14 | $>2, <N$ |

FIG. 2

| LONG-PUCCH DURATION N | OCC MULTIPLEXING CAPACITY M | |
|---|---|---|
| | HOPPING IS USED | HOPPING IS NOT USED |
| 4 | 1 | 2 |
| 5 | 1 | 2 |
| 6 | 1 | 3 |
| 7 | 1 | 3 |
| 8 | 2 | 4 |
| 9 | 2 | 4 |
| 10 | 2 | 5 |
| 11 | 2 | 5 |
| 12 | 3 | 6 |
| 13 | 3 | 6 |
| 14 | 3 | 7 |

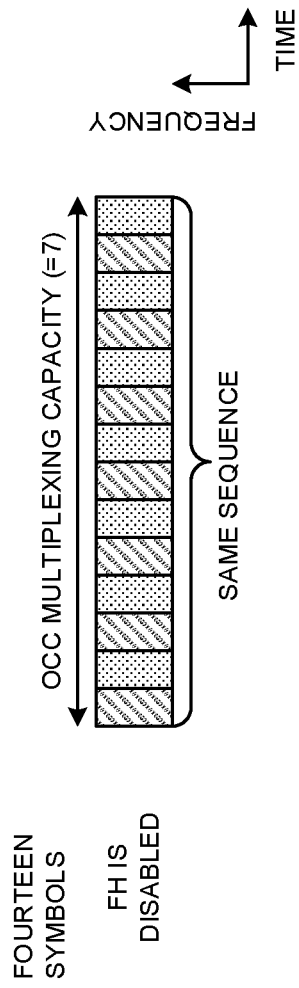
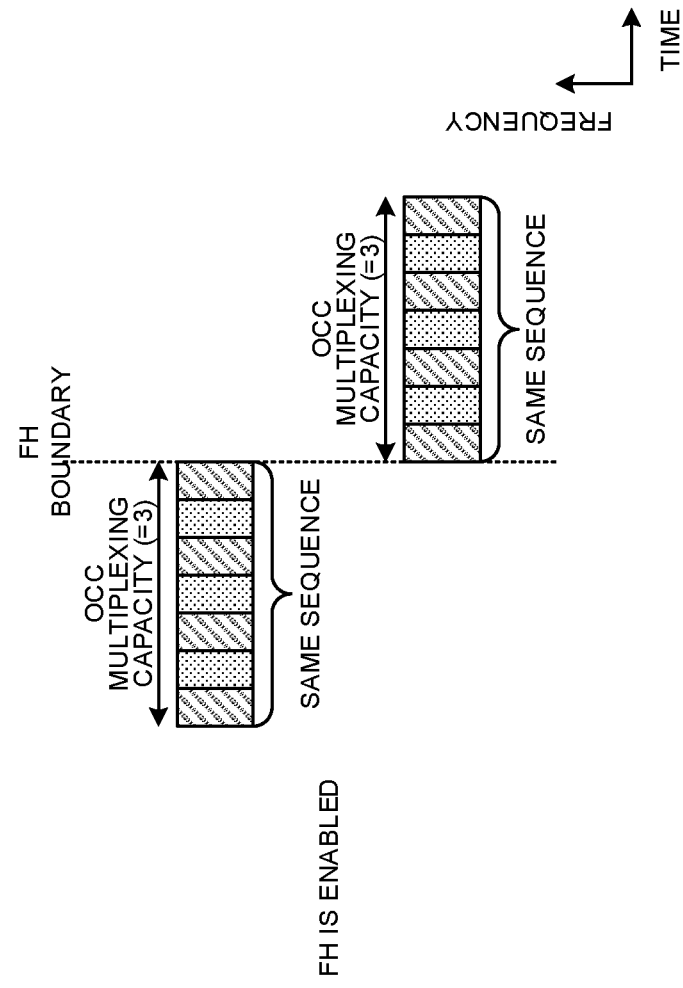
FIG. 4A
FIG. 4B

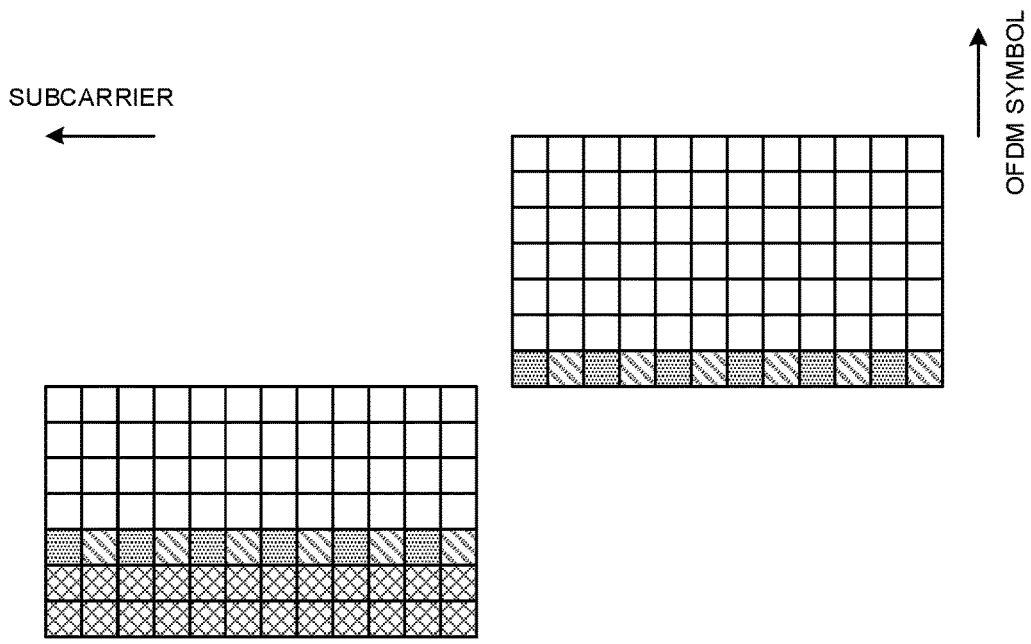
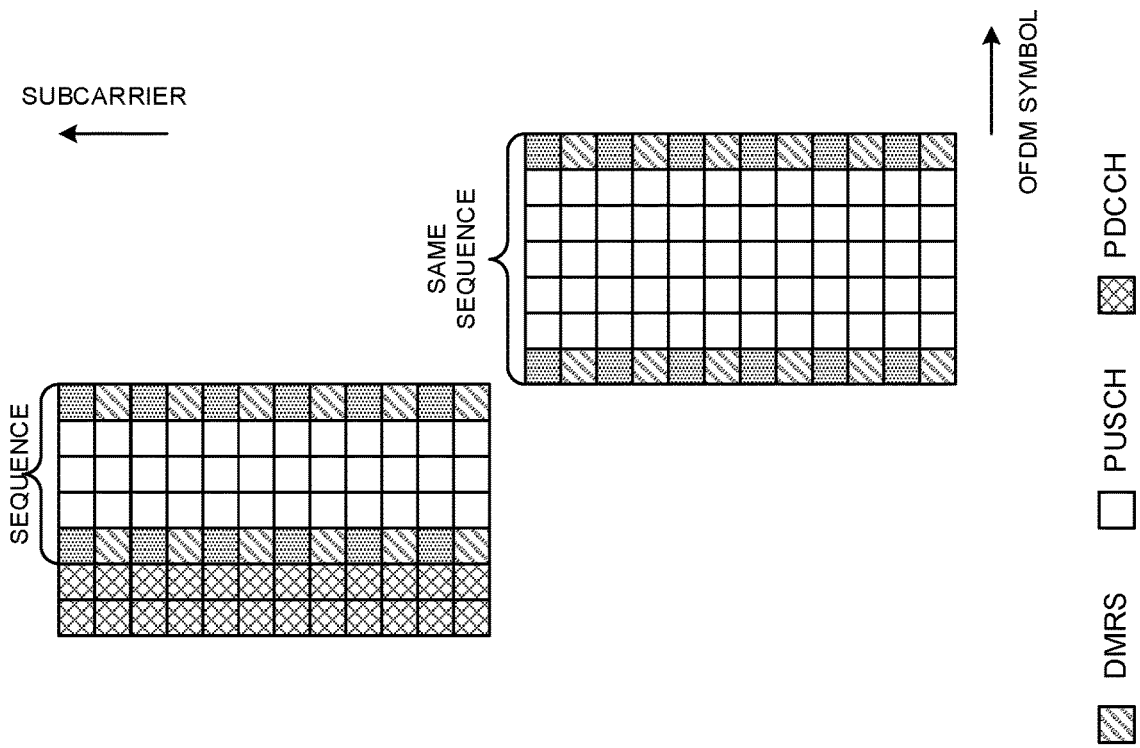

FIG. 10A

| | | | | | |
|---|---|---|---|---|---|
| 26 | 12 | 6 | 12 | 2 | 4 | 19 | 11 |
| 26 | 12 | 6 | 12 | 2 | 4 | 19 | 11 |
| 26 | 12 | 6 | 12 | 2 | 4 | 19 | 11 |
| 26 | 12 | 6 | 12 | 2 | 4 | 19 | 11 |
| 26 | 12 | 6 | 12 | 2 | 4 | 19 | 11 |
| 26 | 12 | 6 | 12 | 2 | 4 | 19 | 11 |
| 26 | 12 | 6 | 12 | 2 | 4 | 19 | 11 |
| 26 | 12 | 6 | 12 | 2 | 4 | 19 | 11 |
| 26 | 12 | 6 | 12 | 2 | 4 | 19 | 11 |
| 26 | 12 | 6 | 12 | 2 | 4 | 19 | 11 |
| 26 | 12 | 6 | 12 | 2 | 4 | 19 | 11 |
| 26 | 12 | 6 | 12 | 2 | 4 | 19 | 11 |
| 26 | 12 | 6 | 12 | 2 | 4 | 19 | 11 |
| 26 | 12 | 6 | 12 | 2 | 4 | 19 | 11 |
| 26 | 12 | 6 | 12 | 2 | 4 | 19 | 11 |
| 26 | 12 | 6 | 12 | 2 | 4 | 19 | 11 |

PRB ↕    SLOT ↔

FIG. 10B

| | | | | | |
|---|---|---|---|---|---|
| 3 | 1 | 2 | 21 | 24 | 16 | 20 | 27 |
| 7 | 18 | 26 | 10 | 14 | 12 | 29 | 5 |
| 12 | 13 | 9 | 16 | 19 | 25 | 26 | 23 |
| 9 | 25 | 9 | 18 | 25 | 18 | 15 | 12 |
| 0 | 3 | 28 | 26 | 17 | 1 | 4 | 15 |
| 2 | 0 | 16 | 1 | 27 | 7 | 12 | 21 |
| 10 | 12 | 19 | 14 | 29 | 13 | 5 | 7 |
| 14 | 23 | 26 | 27 | 11 | 9 | 29 | 7 |
| 10 | 17 | 21 | 26 | 16 | 7 | 20 | 20 |
| 26 | 21 | 2 | 29 | 2 | 7 | 19 | 3 |
| 0 | 20 | 22 | 2 | 23 | 25 | 20 | 28 |
| 15 | 25 | 15 | 19 | 9 | 4 | 16 | 25 |
| 25 | 22 | 10 | 1 | 17 | 2 | 24 | 17 |
| 27 | 28 | 5 | 12 | 5 | 21 | 5 | 23 |
| 9 | 18 | 13 | 20 | 19 | 11 | 2 | 21 |
| 1 | 6 | 7 | 28 | 20 | 20 | 18 | 7 |
| 27 | 0 | 13 | 4 | 7 | 7 | 2 | 2 |
| 9 | 7 | 11 | 11 | 24 | 21 | 25 | 0 |
| 4 | 22 | 14 | 25 | 28 | 0 | 0 | 26 |
| 28 | 9 | 8 | 24 | 29 | 0 | 24 | 16 |

PRB ↕    SLOT ↔

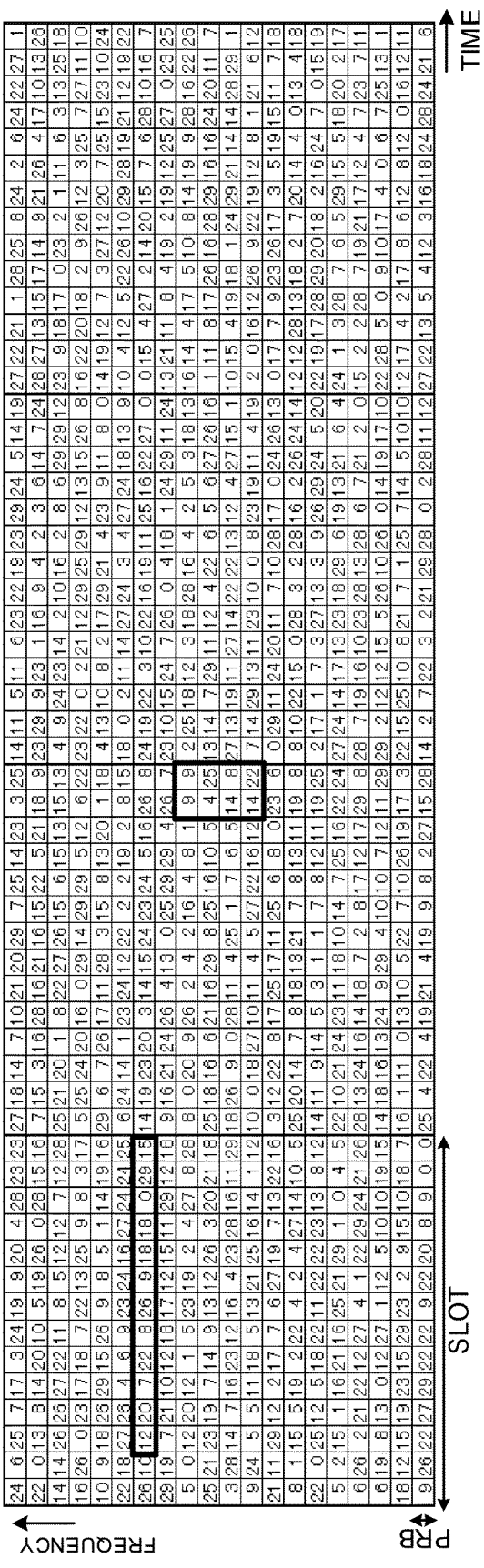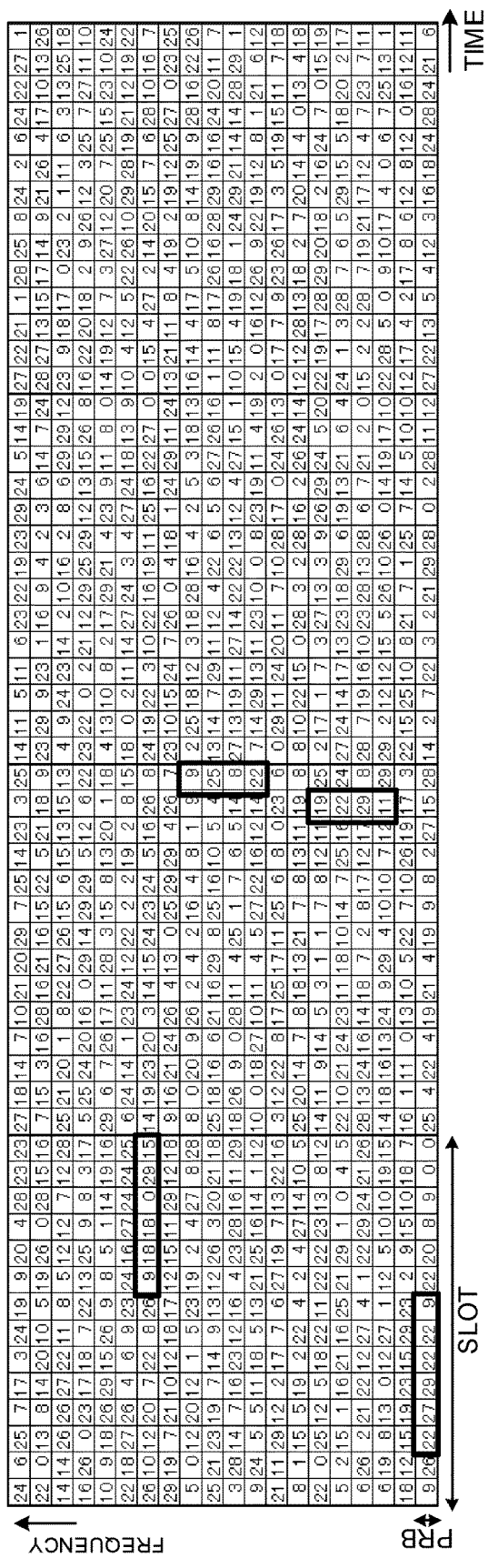
FIG. 12A
FIG. 12B

TERMINAL AND RADIO COMMUNICATION METHOD FOR TRANSMISSION OF A CONTROL CHANNEL OR REFERENCE SIGNAL

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 8 to 13), downlink (DL) and/or uplink (UL) communication are performed using 1-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ (Hybrid Automatic Repeat reQuest)) and so on.

Also, in existing LTE systems (for example, LTE Rel. 8 to 13), a user terminal transmits uplink control information (UCI) by using an uplink control channel (for example, a PUCCH (Physical Uplink Control CHannel)) or an uplink data channel (for example, a PUSCH (Physical Uplink Shared CHannel)). The format of this uplink control channel is referred to as "PUCCH format (PF (PUCCH Format))" and/or the like.

Also, in existing LTE systems, a user terminal multiplexes and transmits a UL channel and a DMRS in a TTI of 1 ms. In a TTI of 1 ms, multiple DMRSs of different layers for the same user terminal (or for different user terminals) are orthogonal-multiplexed using cyclic shifts (CSs) and/or orthogonal spreading codes (for example, orthogonal cover codes (OCCs)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In existing LTE systems (for example, LTE Rel. 13 or earlier versions), interference between cells is reduced by hopping a base sequence for a DMRS (DMRS sequence) for a UL channel every two slots contained in a subframe of 1 ms (for example, sequence group hopping (also referred to as "SGH" or simply "group hopping"), sequence hopping, etc.).

Envisaging future radio communication systems (for example, LTE Rel. 14, 15 and later versions, 5G, NR, etc.), a study is underway to support a first uplink control channel (also referred to as a "short PUCCH," "PUCCH format 0 or 2," and so on) of a relatively short duration (for example one to two symbols), and a second uplink control channel (also referred to as a "long PUCCH," "PUCCH format 1, 3 or 4," and so on) of a duration longer (for example, four to fourteen symbols) than the first uplink control channel.

Also, in future radio communication systems, the duration to allocate an uplink control channel (for example, a long PUCCH) and/or the starting symbol may be configured flexibly in predetermined slots (given slots). For example, it is anticipated that every UE's UL transmission will be supported using uplink control channels with varying durations and/or starting symbols on a per slot basis. Also, for future radio communication systems, studies are underway to control whether or not to apply frequency hopping in slots.

As described above, in future radio communication systems where communication is controlled using different durations and/or starting symbols from those of existing LTE systems, how to control the sequences to apply to DMRSs and/or PUCCHs (or sequence hopping) is a problem.

The present invention has been made in view of the above, and it is therefore an object of the present invention to provide a user terminal and a radio communication method that can appropriately configure sequences to apply to reference signals, uplink control channels and/or other signals and channels in future radio communication systems.

Solution to Problem

In accordance with one aspect of the present invention, a user terminal has a transmitting section that transmits a demodulation reference signal and/or an uplink control channel, to which predetermined sequences are applied, in predetermined slots, and a control section that controls each predetermined sequence that is used in the predetermined slots based on whether or not frequency hopping is used in the predetermined slots.

Advantageous Effects of Invention

According to the present invention, it is possible to appropriately configure sequences to apply to reference signals and/or uplink control channels in future radio communication systems.

BRIEF DESCRIPTION OF DRAWINGS

FIG. 2 is a diagram to show an example of a PUCCH format in future radio communication systems;

FIGS. 4A and 4B are diagrams illustrating relationships between OCC multiplexing capacities and sequences that are applied;

FIGS. 7A and 7B are diagrams, each illustrating a predetermined sequence that is applied to a DMRS for a PUSCH;

FIGS. 10A and 10B are diagrams to show other examples of group numbers (or predetermined sequence indices) corresponding to individual radio resources;

FIGS. 11A and 11B are diagrams to show other examples of group numbers (or predetermined sequence indices) corresponding to individual radio resources, respectively;

FIGS. 12A and 12B are diagrams to show other examples of group numbers (or predetermined sequence indices) corresponding to individual radio resources;

FIG. 13 is a diagram to show examples of CS indices corresponding to individual radio resources;

FIG. 14 is a diagram to show other examples of CS indices corresponding to individual radio resources;

DESCRIPTION OF EMBODIMENTS

Figure 1A:
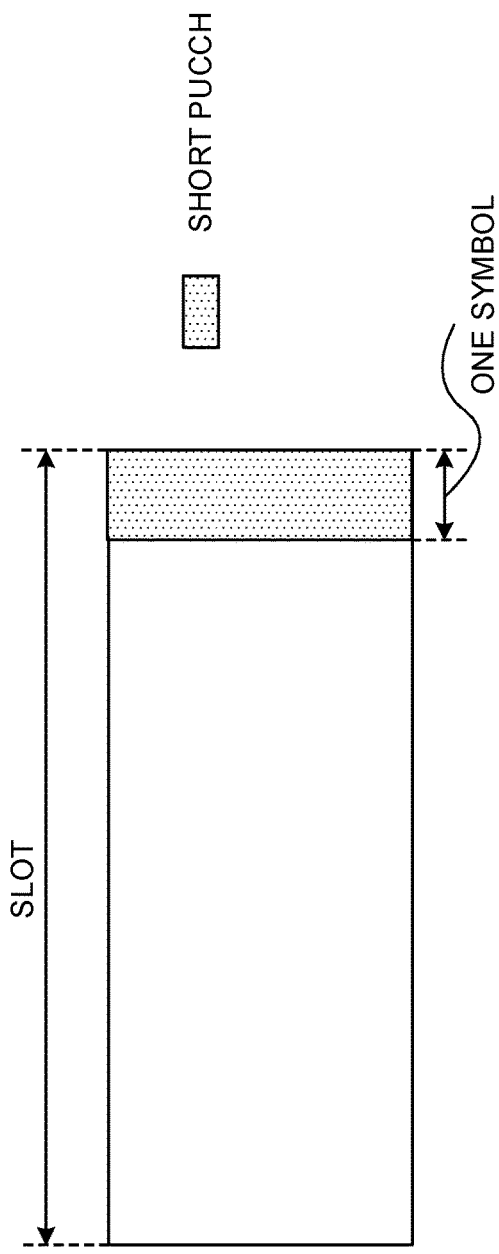
FIGS. 1A and 1B provide diagrams, each showing an example of the format of an uplink control channel in future radio communication systems.

In existing LTE systems (for example, LTE Rel. 13 or earlier versions), two slots are provided in a TTI of 1 ms. Also, the DMRS for use for demodulating the PUSCH is arranged in one symbol in each slot (two symbols in a TTI of 1 ms). As for base sequences of DMRSs (also referred to as the "DMRS sequences" and so on), for example, Zadoff-Chu (ZC)-based sequences are used.

Also, the number of DMRS sequences in existing LTE systems is configured to 30 or 60, depending on the bandwidth. For example, the number of DMRS sequences is thirty when the bandwidth is five physical resource blocks (also referred to as "PRBs," "resource blocks (RBs)," etc.) or less, and sixty when the bandwidth is six PRBs or more.

In existing LTE systems, when the bandwidth is five PRBs or less, thirty DMRS sequences are identified by group numbers (u=0 to 29) (also referred to as "group indices" and so on). Also, when the bandwidth is six PRBs or more, sixty DMRS sequences are identified by group numbers (u=0 to 29) and base sequence numbers (v=0 and 1) (also referred to as "sequence indices" and so on).

When the same DMRS sequence is used among multiple user terminals in different cells, transmission signals from each of the multiple user terminals interfere with each other. Therefore, in order to prevent these multiple user terminals from continuing using the same DMRS sequence, the DMRS sequence is hopped for each slot in a 1-ms TTI. For example, in existing LTE systems, two kinds of hopping methods are used (namely, sequence group hopping and sequence hopping).

In sequence group hopping (also referred to as "SGH" or simply "group hopping"), the above-noted group number (u) hops per slot in a TTI of 1-ms. In SGH, each slot's group number (u) is determined based on the hopping pattern ($f_{gh}$) and the sequence shift pattern ($f_{ss}$). These hopping patterns and/or sequence shift patterns may be based on physical cell IDs (cell IDs) or virtual cell IDs. A user terminal may identify physical cell IDs from the sequence numbers of synchronization signals (PSS/SSS), and identify virtual cell IDs based on RRC signaling. Note that, in existing LTE systems, for example, seventeen hopping patterns and thirty sequence shift patterns are used.

Meanwhile, in sequence hopping, the above-mentioned base sequence number (v) is hopped per slot within one TTI. The base sequence number (v) of each slot is determined based on a physical cell ID or a virtual cell ID. Sequence hopping is applied when the bandwidth is six PRBs or more, and is not used in combination with SGH (when SGH is applied, v=0 is configured).

As described above, in existing LTE systems, interference is randomized between cells, so that SGH or sequence hopping can be applied to DMRS sequences.

In future radio communication systems (for example, LTE Rel. 15 and later versions, 5G, NR, etc.), a study is underway to transmit UCI using uplink control channels (for example, PUCCHs) of multiple formats (for example, NR PUCCH formats (NR PFs), which are also simply referred to as "PUCCH formats") with at least different durations.

Figure 1B:
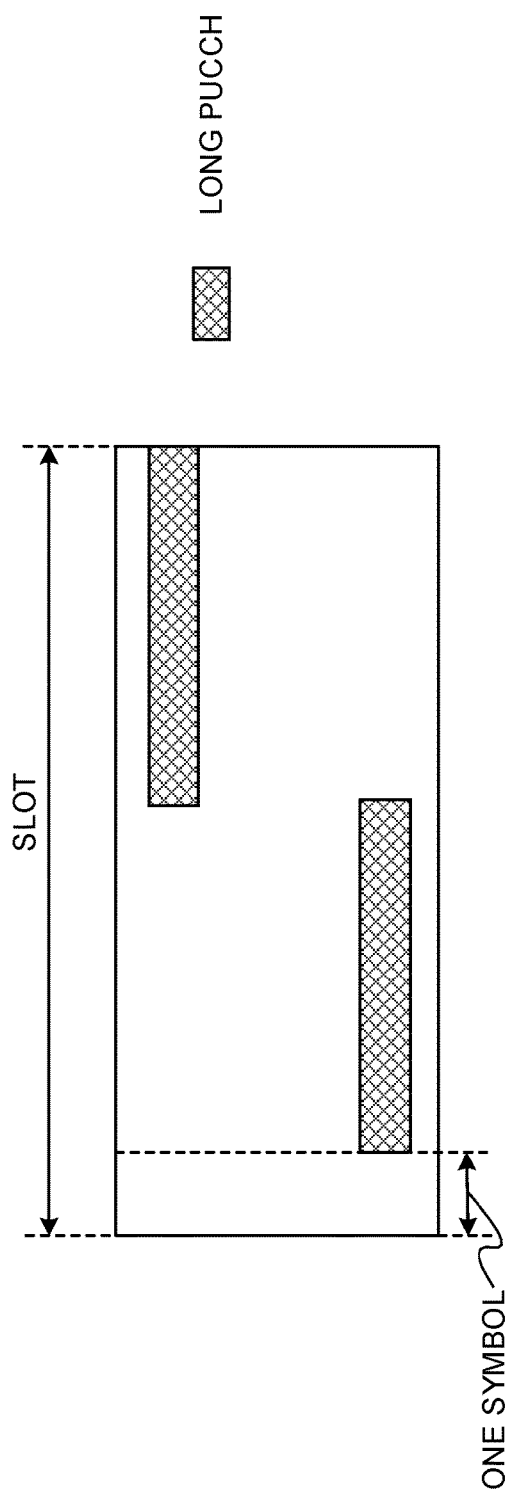

FIG. 1 provide diagrams to show examples of PUCCHs in future radio communication systems. FIG. 1A shows a PUCCH (a short PUCCH or a first uplink control channel) that is comprised of a relatively small number of symbols (for example, to have a duration of one to two symbols). FIG. 1B shows a PUCCH (a long PUCCH or a second uplink control channel) that is comprised of a larger number of symbols than a short PUCCH (for example, to have a duration of four to fourteen symbols).

As shown in FIG. 1A, a short PUCCH may be arranged in a predetermined number of symbols (here, one symbol) from the end of a slot. Note that the symbols for arranging a short PUCCH are not confined to the end of a slot, and a predetermined number of symbols at the top or in the middle of a slot may be used as well. Also, a short PUCCH may be arranged in one or more frequency resources (for example, one or more PRBs). Note that, although the short PUCCH of FIG. 1A is placed in consecutive PRBs, the short PUCCH may be arranged in non-consecutive PRBs as well.

Also, a short PUCCH may be time-division-multiplexed and/or frequency-division-multiplexed with an uplink data channel (hereinafter also referred to as a "PUSCH") within a slot. Also, a short PUCCH may be time-division-multiplexed and/or frequency-division-multiplexed with a downlink data channel (hereinafter also referred to as a "PDSCH") and/or a downlink control channel (hereinafter also referred to as a "PDCCH (Physical Downlink Control CHannel)") within a slot.

For a short PUCCH, a multi-carrier waveform (for example, the OFDM (Orthogonal Frequency Division Multiplexing) waveform) may be used, or a single-carrier waveform (for example, the DFT-s-OFDM (Discrete Fourier Transform-Spread-Orthogonal Frequency Division Multiplexing) waveform) may be used.

On the other hand, as shown in FIG. 1B, a long PUCCH is arranged over a larger number of symbols (for example, four to fourteen symbols) than a short PUCCH. Referring to FIG. 1B, this long PUCCH is not arranged in a predetermined number of symbols at the top of the slot, but can be arranged in a predetermined number of symbols at the top.

As shown in FIG. 1B, a long PUCCH may be comprised of fewer frequency resources (for example, one or two PRBs) than a short PUCCH so as to achieve a power boosting effect, or may be comprised of frequency resources equal to the short PUCCH.

Also, a long PUCCH may be frequency-division-multiplexed with a PUSCH in a slot. In addition, a long PUCCH may be time-division-multiplexed with a PDCCH in a slot. Also, a long PUCCH may be arranged with a short PUCCH in the same slot. For a long PUCCH, a single-carrier waveform (for example, DFT-s-OFDM waveform) may be used, or a multi-carrier waveform (for example, OFDM waveform) may be used.

Also, as shown in FIG. 1B, frequency hopping, in which the frequency resource hops at a predetermined timing within a slot may be applied to a long PUCCH. The timing at which the frequency resource hops in a long PUCCH may be referred to as the "hopping boundary," the "hopping timing," the "hopping pattern," and so on.

FIG. 2 is a diagram to show an example of a PUCCH format in future radio communication systems. FIG. 2 shows multiple PUCCH formats (NR PUCCH formats) with varying numbers of symbols and/or varying numbers of UCI bits. Note that the PUCCH formats shown in FIG. 2 are simply examples, and the contents and the index numbers of PUCCH formats 0 to 4 are not limited to those shown in FIG. 2.

For example, PUCCH format 0 in FIG. 2 is a short PUCCH for UCI of up to two bits, and is also referred to as a "sequence-based short PUCCH" and so on. This short PUCCH conveys UCI of up to two bits (for example, an HARQ-ACK and/or an SR) in one or two symbols.

PUCCH format 1 is a long PUCCH for UCI of up to two bits. This long PUCCH conveys UCI of up to two bits in four to fourteen symbols. In PUCCH format 1, for example, multiple user terminals may be code-division-multiplexed (CDM) in the same PRB by block-wise spreading in the time domain, which uses cyclic shift (CSs) and/or orthogonal spreading codes (OCCs (Orthogonal Cover Codes)).

PUCCH format 2 is a short PUCCH for UCI of more than two bits. This short PUCCH conveys more than two bits of UCI in one or two symbols.

PUCCH format 3 is a long PUCCH for UCI exceeding N bits, and a single user terminal is multiplexed in the same PRB. N may be a predetermined value (for example, 2). This long PUCCH conveys UCI that is larger than N bits (or N bits or more), in four to fourteen symbols. PUCCH format 3 is different from following PUCCH format 4 in that a plurality of user terminals are not multiplexed in the same PRB. Also, OCCs may be applied to PUCCH format 3 prior to DFT spreading.

PUCCH format 4 is a long PUCCH for UCI of more than two bits and multiple user terminals can be multiplexed within the same PRB. This long PUCCH conveys UCI that exceeds two bits and that is smaller than N bits (or up to N bits) in four to fourteen symbols. In PUCCH format 4, multiple user terminals may be code-division-multiplexed in the same PRB by block-wise spreading in the time domain, which uses CSs and/or OCCs. Alternatively, a plurality of user terminals may be multiplexed using at least one of (frequency-domain) block-wise spreading before the discrete Fourier transform (DFT), frequency division multiplexing (FDM), and comb-tooth-shaped subcarriers (combs). Also, OCCs before DFT spreading need not be applied to PUCCH format 4.

Note that the threshold N for the number of UCI bits may be an integer to exceed three (or up to three), and may be specified in the specification, or may be configured by higher layer signaling (at least one of RRC (Radio Resource Control) signaling, broadcast information (for example, the MIB (Master Information Block)), system information (for example, SIBs (System Information Blocks), RMSI (Remaining Minimum System Information), etc.). Alternatively, the threshold N needs not be defined.

PUCCH format 4 is different from PUCCH format 3 in that a plurality of user terminals can be multiplexed in the same PRB. Note that PUCCH format 3 and PUCCH format 4 may be interchanged and defined, and PUCCH format 3 and PUCCH format 4 may be defined as being the same PUCCH format (for example, PUCCH format 3).

Note that, in FIG. 2, N may be used in different values between PUCCH format 3 and PUCCH format 4. For example, N=2 may be used in PUCCH format 3, and N=100 may be used in PUCCH format 4. The PUCCH formats that can be used in the present embodiment are not limited to the configurations shown in FIG. 2.

Figures 3A, 3B:
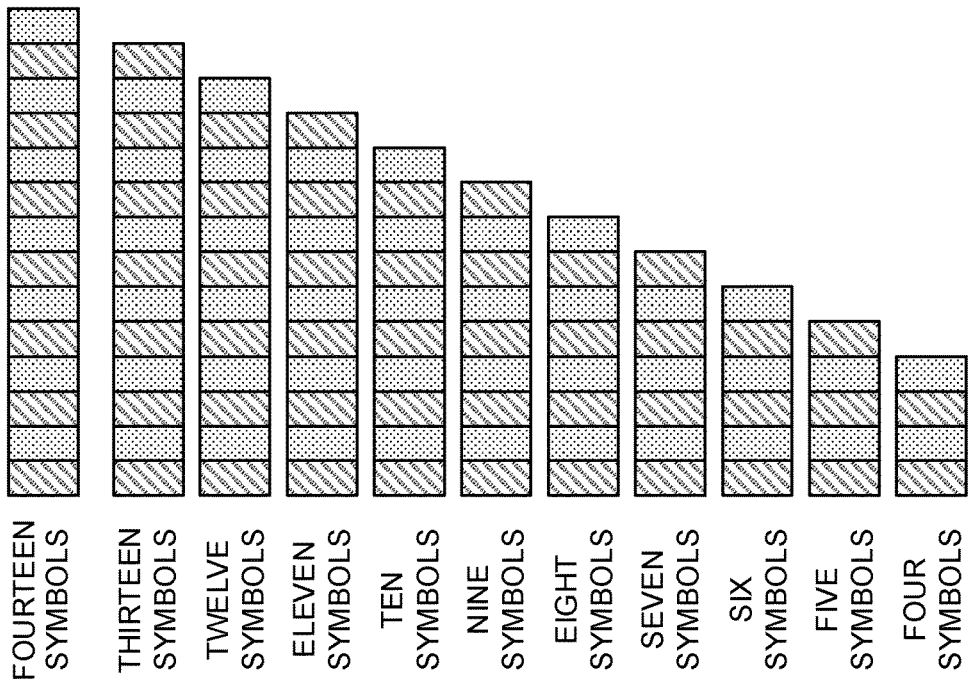
FIGS. 3A and 3B are diagrams to show examples of durations of long PUCCHs and examples of OCC multiplexing capacities per period.

Also, in future radio communication systems, the duration to allocate an uplink control channel (for example, a long PUCCH) and/or the starting symbol may be configured flexibly in predetermined slots (see FIG. 3A). FIG. 3A shows a case where the duration (symbols) to allocate a PUCCH is configured to four to fourteen. Note that the locations and/or the proportions of DMRS symbols and UCI symbols are not limited to the format shown in FIG. 3A.

Also, in future radio communication systems, the number of user terminals to be multiplexed by using OCCs is determined based on the duration of a long PUCCH (for example, PF 1 that conveys up to two bits of UCI) (long PUCCH duration). The number of user terminals to be multiplexed by OCCs in the time domain (also referred to as "time domain OCCs") may be paraphrased as the "OCC multiplexing capacity," the "OCC length," the "spreading factor (SF)" and so on.

FIG. 3B is a diagram to show examples of OCC multiplexing capacities per long PUCCH duration. As shown in FIG. 3B, the OCC multiplexing capacity M for each long PUCCH duration may be assigned different values depending on whether or not frequency hopping is used in this long PUCCH duration. For example, referring to FIG. 3B, if the long PUCCH duration N is fourteen symbols, and frequency hopping is used, the OCC multiplexing capacity is three. On the other hand, if frequency hopping is not used, the OCC multiplexing capacity is seven.

When UEs are multiplexed using cyclic shifts (CSs) in addition to OCCs, the maximum value of multiplexing capacity in a given resource is the maximum value of OCC capacity×the number of CSs. The number of CSs may be a predetermined value (for example, 12).

When applying time domain OCCs to a PUCCH (for example, PF 1), from the viewpoint of maintaining orthogonality, the base sequence needs to be the same (the same base sequence needs to be applied) within a range of the same OCC length. Note that the cyclic shifts to be applied to base sequences may assume different values.

For example, when the duration of a PUCCH is comprised of fourteen symbols and frequency hopping is disabled, the OCC multiplexing capacity (OCC length) is seven (see FIG. 3B). In this case, the same base sequence needs to be applied to the PUCCH to which OCC multiplexing capacity 7 applies (the UCI symbols of the PUCCH and/or the DMRS symbols for the PUCCH) (see FIG. 4A).

Meanwhile, when the duration of a PUCCH is comprised of fourteen symbols and frequency hopping is enabled, the OCC multiplexing capacity (OCC length) is three (see FIG. 3B). in this case, it is necessary to apply the same base sequence to the PUCCH of the first half of a frequency hop, where OCC multiplexing capacity 3 is applied, and apply the same base sequence to the PUCCH of the second half of the frequency hop (see FIG. 4B).

In this case, how to control the generation of base sequences (for example, base sequences to apply to PUCCHs) when frequency hopping is applied (enabled) and when frequency hopping is not applied (disabled) is the problem. Alternatively, while, in existing LTE systems, frequency hopping for PUCCHs is executed on a per slot basis (in units of slots), in future radio communication systems, it is assumed that frequency hopping is executed within a slot. In this case, how to control the generation of base sequences raises a problem.

Therefore, as one aspect of the present invention, the present inventors have come up with the idea of controlling each predetermined sequence (given sequence) for use in predetermined slots (including, for example, the number of predetermined sequences), taking into account whether or not frequency hopping is used in these predetermined slots. For example, in a slot in which frequency hopping is used, different base sequences may be used every time frequency hopping is applied.

Furthermore, in accordance with another aspect of the present invention, the present inventors have come up with the idea of controlling each predetermined sequence for use in predetermined slots (including, for example, the number of predetermined sequences) without taking into account whether or not frequency hopping is used in these predetermined slots (that is, regardless of whether or not frequency hopping is used). For example, in a slot in which frequency hopping is used, the same base sequence may be used between frequency hops.

Now, the present embodiment will be described below in detail. The embodiments described below may be applied independently or in combination. A predetermined sequence according to the following present embodiment can be used for at least one of UCI symbols of a PUCCH (for example, a long PUCCH), DMRS symbols of a PUCCH (for example, a long PUCCH), a base sequence for a PUCCH (for example, a short PUCCH) and a DMRS for a PUSCH. Obviously, a predetermined sequence may be applied to other signal and/or channel sequences. Also, a predetermined sequence may be referred to as a "base sequence," a "reference signal sequence," or a "demodulation reference signal sequence."

Also, according to the present embodiment described below, to hop a predetermined sequence might mean to hop the group number of the predetermined sequence (which is also referred to as "sequence group hopping (SGH)," "group hopping" and so on), and/or to hop the base sequence number of the predetermined sequence (which is also referred to as "sequence hopping" and so on). Also, hopping of a predetermined sequence is not limited to above SGH and/or sequence hopping as long as different predetermined sequences are used per predetermined duration (for example, per sTTI).

Furthermore, according to the present embodiment, a predetermined sequence may be identified based on a group number and/or a base sequence number. In the following description, if there are parts regarding generation of predetermined sequences that are not specifically mentioned, methods (for example, mathematical formulas and so on) for generating base sequences (or DMRS sequences) in existing LTE systems may be applied.

(First Aspect)

In accordance with a first aspect of the present invention, a case will be described below where predetermined sequences (including, for example, the number of predetermined sequences) that are used in predetermined slots are each controlled independently, taking into account whether or not frequency hopping (FH) is used in these predetermined slots. To be more specific, a case will be described below where, in a predetermined slot, the number of predetermined sequences used to transmit the PUCCH and/or others when frequency hopping (FH) is disabled and the number of predetermined sequences used to transmit the PUCCH and/or others when frequency hopping is enabled are configured separately (for example, to be different numbers. Note that, although, in the description below, the number of predetermined sequences to apply to transmission of PUCCHs and others will be described as an example, the method of generating predetermined sequences may be controlled depending on whether or not frequency hopping is applied.

Figure 5A:
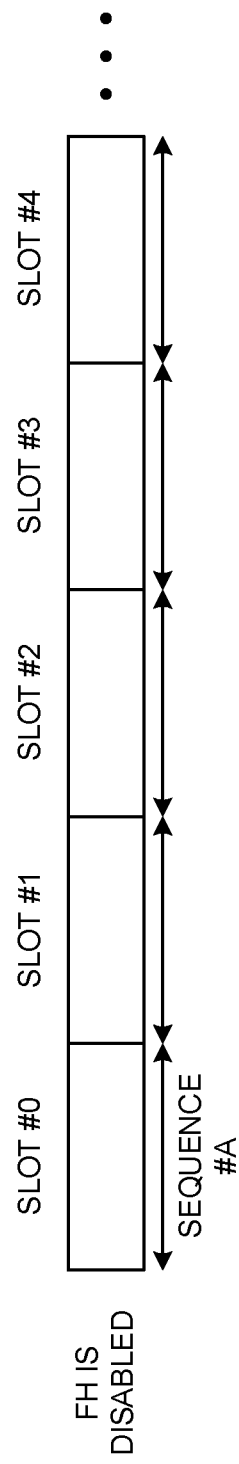
FIGS. 5A and 5B are diagrams to show examples of predetermined sequences according to the present embodiment.

When frequency hopping is configured disabled, a predetermined number of predetermined sequences (for example, one predetermined sequence) are used in each slot (see FIG. 5A). For example, when frequency hopping is disabled in slots #0 to #4 of FIG. 5A, in each slot, one predetermined sequence (here, one of predetermined sequences #A0 to #A4) is used for at least one of UCI symbols of the PUCCH, DMRS symbols of the PUCCH, a base sequence for the PUCCH, and the DMRS for the PUSCH. FIG. 5A shows a case where predetermined sequence #A is applied to slot #0.

In this case, predetermined sequence #A (for example, the index of predetermined sequence #A) is determined using at least one of the cell ID, the virtual cell ID, the slot index and the PRB index. To be more specific, the index of predetermined sequence #A may be determined using an equation that contains at least one of the virtual cell ID, the slot index and the PRB index.

For example, when predetermined sequence #A is selected based at least on the slot index, the index of the predetermined sequence can be randomized between slots. That is, a predetermined sequence that is different from predetermined sequence #A can be used in slot #1. By this means, it is possible to prevent interference from being produced between neighboring cells.

Figure 6:
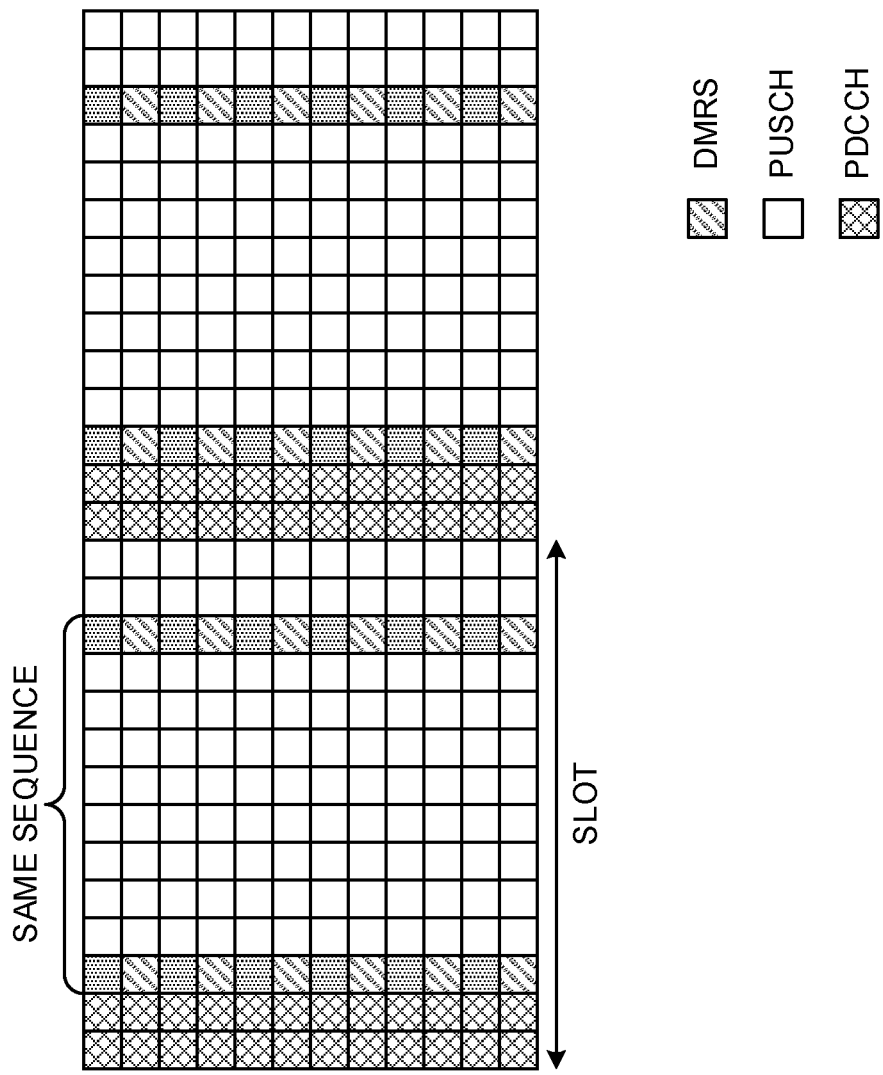
FIG. 6 is a diagram to explain a predetermined sequence that is applied to a DMRS for a PUSCH.

Also, by using one (the same) predetermined sequence in a predetermined slot, the OCC length in the time domain can be applied to DMRSs or PUCCHs (see FIG. 6). FIG. 6 shows a format in which DMRSs for a PUSCH are placed in two symbols in a slot (in this case, in the third and twelfth symbols from the beginning). In this case, by applying the same sequence (for example, a DMRS sequence) to DMRSs in different symbols, time domain OCCs can be applied to the DMRSs. By this means, the multiplexing capacity of UEs can be increased.

Note that, FIG. 5A shows the case where one predetermined sequence is used per slot, but this is by no means limiting. Several predetermined sequences may be used if time domain OCCs are unnecessary because of the arrangement of signals or channels and other reasons.

Figure 5B:
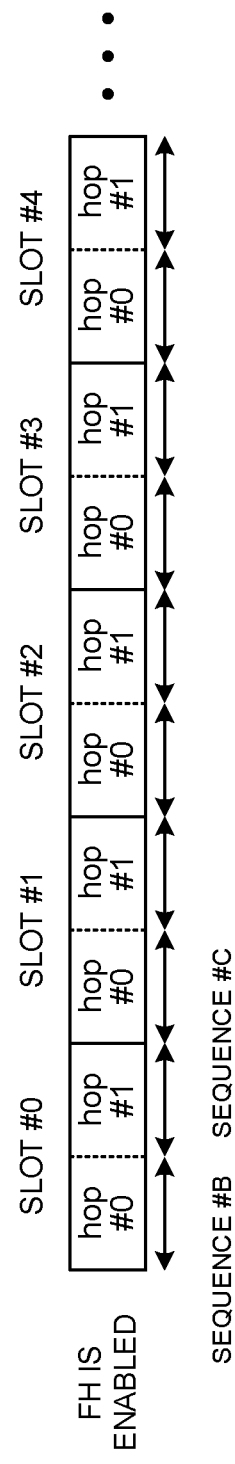

When frequency hopping is configured enabled, multiple predetermined sequences (predetermined sequence indices) are used in each slot (see FIG. 5B). For example, if frequency hopping is enabled in each of slots #0 to #4 of FIG. 5B, a number of predetermined sequences that match the number of frequency fields used for hopping in each slot (for example, the number of hops+1) are used for at least one of UCI symbols of the PUCCH, DMRS symbols of the PUCCH, base sequences for the PUCCH, and DMRS s for the PUSCH. For example, in the event a frequency hops once, predetermined sequences are mapped to two frequency fields, so that two predetermined sequences (here, predetermined sequences #B and #C) may be used in each slot.

In this case, predetermined sequences #B and #C (for example, indices of predetermined sequences #B and #C) are selected using at least one of the cell ID, the virtual cell ID, the slot indices, the PRB indices, the hop indices and the starting symbol index of each hop. To be more specific, the indices of predetermined sequences #B and #C may be determined using an equation including at least one of the cell ID, the virtual cell ID, the slot indices, the PRB indices, the hop indices and the index of the starting symbol of each hopping part.

The hop indices may be numbered according to the order of hops. For example, in the event a frequency hops once, the index value of the first half part of this frequency hop may be set to 0, and the index value of the second half part of this frequency hop may be set to 1.

For example, when a PUCCH and/or a PUSCH is allocated from a symbol in the middle of a slot, the predetermined sequence to apply to the first half part of this frequency hop is selected based on the hop index corresponding to the first half part. Similarly, the predetermined sequence to apply to the second half part of this frequency hop is selected based on the hop index corresponding to the second half part. In this case, the predetermined sequence may be selected regardless of the indices of the symbols (without using the indices of the symbols) where the PUCCH and/or the PUSCH are allocated. Also, control may be executed so that different predetermined sequences are used between frequency hops and between slots.

In this way, when frequency hopping is applied, different predetermined sequences are used in each hopping part, so that it is possible to provide a frequency diversity effect, and prevent interference from being produced between neighboring cells.

Even when frequency hopping is applied, the OCC length in the time domain can be applied to DMRSs or PUCCHs by using one (the same) predetermined sequence in each hopping part (see FIG. 7). FIG. 7A shows a format in which DMRSs for the PUSCH are placed in two symbols in the first half part of a hop (in this case, in the third and seventh symbols from the beginning), and in which DMRSs for the PUSCH are placed in two symbols in the second half part (here, the first and seventh symbols from the beginning). In this case, the same sequence (for example, a DMRS sequence) is applied to the DMRSs of different symbols in each hopping part, so that time domain OCCs can be applied to the DMRSs. By this means, the multiplexing capacity of UEs can be increased.

Note that FIG. 7A shows a case where one predetermined sequence is used per slot, but this is by no means limiting. Several predetermined sequences may be used in each hopping part if time domain OCCs are unnecessary because of the arrangement of signals or channels and other reasons (FIG. 7B).

Also, the index of predetermined sequence #A used when frequency hopping is disabled and the index of predetermined sequence #B or #C (one of several) used when frequency hopping is enabled may be the same value, or may be different values. For example, predetermined sequences #A and #B, or predetermined sequences #A and #C may be the same value, or predetermined sequences #A to #C may be different values.

In this way, predetermined sequences for use in predetermined slots are each controlled independently based on whether or not frequency hopping is used in these predetermined slots, so that the predetermined sequence to use can be configured flexibly depending on whether or not frequency hopping is used in slots.

(Second Aspect)

In accordance with a second aspect of the present invention, a case will be described below where predetermined sequences (including, for example, the number of predetermined sequences) to use in predetermined slots are controlled without taking into account whether or not frequency hopping is used in these predetermined slots (regardless of whether or not frequency hopping is used). To be more specific, a case will be described below where, in a predetermined slot, the number of predetermined sequences used to transmit the PUCCH and/or others when frequency hopping is disabled and the number of predetermined sequences used to transmit the PUCCH and/or others when frequency hopping is enabled are configured common. Note that, although, in the description below, the number of predetermined sequences will be described as an example, the method of generating predetermined sequences may be controlled regardless of whether or not frequency hopping is applied.

Figure 8A:
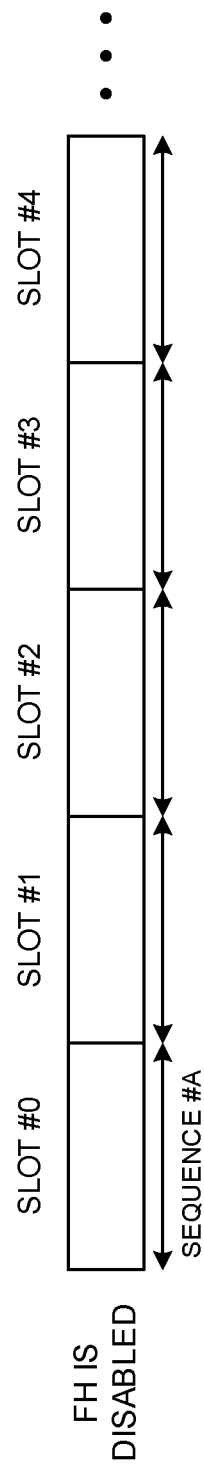
FIGS. 8A and 8B are diagrams to show examples of predetermined sequences according to the present embodiment.

When frequency hopping is configured disabled, and when frequency hopping is configured enabled, a predetermined number of predetermined sequences (for example, one predetermined sequence) are used in each slot (see FIG. 8). For example, when frequency hopping is not performed in slots #0 to #4 of FIG. 8A, in each slot, one predetermined sequence is used for at least one of UCI symbols of the PUCCH, DMRS symbols of the PUCCH, a base sequence for the PUCCH, and the DMRS for the PUSCH. FIG. 8A shows a case where predetermined sequence #A is applied to slot #0.

Figure 8B:
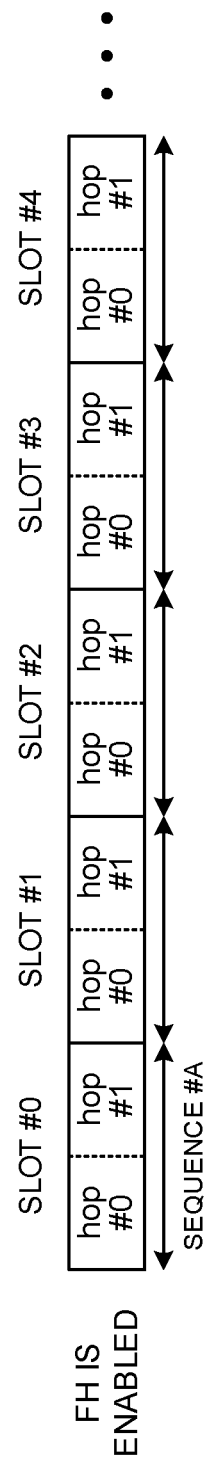

Similarly, when frequency hopping is used in slots #0 to #4 of FIG. 8B, in each slot, one predetermined sequence is used for at least one of UCI symbols of the PUCCH, DMRS symbols of the PUCCH, a base sequence for the PUCCH, and the DMRS for the PUSCH. FIG. 8B shows a case where a predetermined sequence (for example, predetermined sequence #A) that is generated by the same method (for example, the equation) as in FIG. 8A is applied to slot #0.

In this case, predetermined sequence #A (for example, the index of the predetermined sequence) is determined using at least one of the cell ID, the virtual cell ID, the slot index, the PRB index and the starting symbol index of each hopping part. To be more specific, the index of predetermined sequence #A may be determined using an equation that contains at least one of the virtual cell ID, the slot index, the PRB index, and the index of the starting symbol of each hopping part.

If frequency hopping is configured enabled in a predetermined slot, a predetermined sequence index that is common to each frequency hopping part is applied. For example, as shown in FIG. 8B, a common predetermined sequence is applied to the first half part (hop #0) and the second half part (hop #1) of a frequency hop in each slot.

For example, a UE may select a predetermined sequence based at least on the slot index. As a result, it is possible to randomize the index of the predetermined sequence between slots. By this means, it is possible to prevent interference from being produced between neighboring cells.

In addition, predetermined sequences that are derived based on a common selection method (for example, an equation) when frequency hopping is configured disabled and when frequency hopping is configured enabled, so that selection of predetermined sequences can be simplified. This makes it possible to reduce the load of transmission processes on the UE.

(Third Aspect)

In accordance with a third aspect of the present invention, an example of the method of selecting predetermined sequences will be described below. Note that the method of selecting predetermined sequences, which will be described below, can be adequately applied to the predetermined sequences of the first aspect and the second aspect.

Hereinafter, a case where one sequence is selected per slot, regardless of the indices of symbols (for example, the top symbol index) where a PUCCH, a DMRS and/or others are allocated (sequence selection example 1), a case where a plurality of (for example, two) sequences are selected per slot (sequence selection example 2), and a case where one or more sequences are selected based on the indices of symbols (for example, the top symbol index) where a PUCCH, a DMRS and/or others are allocated (sequence selection example 3) will be described below.

Sequence selection example 1 can be suitably applied to the case where the frequency hopping pattern of the first aspect is configured disabled and to the second aspect. Sequence selection example 2 can be suitably applied to the first aspect and the second aspect (especially when the frequency hopping pattern is configured enabled in the first aspect). Sequence selection example 3 can be suitably applied to the first aspect and the second aspect. Note that these are by no means the only methods for selecting predetermined sequences.

Sequence Selection Example 1

A UE selects a predetermined sequence using the index of a predetermined parameter. For example, the UE may select the index of a predetermined sequence by using an equation that contains the index of a predetermined parameter. The index of a predetermined sequence can be determined based on a group number and a base sequence number (for example, based on an equation that contains the group number and the base sequence number).

The group number (u) may be defined using, for example, an equation that contains a slot index and/or a frequency resource (PRB and/or RE) index (see equation 1).

$$u = (f_{gh}^{slot}(n_s) + f_{gh}^{PRB}(k) + f_{ss}) \bmod 30 \quad \text{(Equation 1)}$$

Equation 1 is an equation for use for determining the group number (u) that corresponds to minimum frequency resource index (lowest PRB and/or RE index) #k where slot #$n_s$, a PUCCH and/or a PUSCH are allocated. Here, the group number (u) is defined based on group hopping patterns $f_{gh}^{slot}(n_s)$ and $f_{gh}^{PRB}(k)$ and a sequence shift pattern ($f_{ss}$). Note that the slot index may be a slot index (a vertical slot index) that is initialized ($n_s=0$) every predetermined duration (for example, 10 ms).

Group hopping pattern $f_{gh}^{slot}(n_s)$ contains a slot index, and group hopping pattern $f_{gh}^{PRB}(k)$ contains a frequency resource (PRB and/or RE) index. Note that the equation for the group number of a predetermined sequence is not limited to above equation 1. A configuration that does not include some of the group hopping pattern parameters (for example, $f_{gh}^{PRB}(k)$) may be used. Alternatively, a configuration to include other parameters may be used.

In this way, the group number (u) can be determined based on hopping patterns and a sequence shift pattern. These hopping pattern and/or sequence shift pattern may be based on a physical cell ID (cell ID) or a virtual cell ID. The UE may identify the physical cell ID from the sequence number of synchronization signals (PSS/SSS), and identify the virtual cell ID based on RRC signaling.

By selecting the group number (u) taking into account the slot and/or the PRB where the PUCCH or the DMRS is allocated, the predetermined sequence can be randomized between slots and/or between PRBs. As a result of this, even when PUCCHs or DMRSs are allocated in units of slots and/or in units of PRBs, interference between cells can be reduced.

A configuration may be used here in which some or all of group hopping patterns $f_{gh}^{slot}(n_s)$ and $f_{gh}^{PRB}(k)$ can be configured enabled or disabled based on reports from the base station. For example, higher layer signaling (for example, cell-specific RRC signaling (RRC parameter), and/or broadcast signals, etc.) can be used to send reports from the base station.

Now, a case where whether or not to use all of group hopping patterns $f_{gh}^{slot}(n_s)$ and $f_{gh}^{PRB}(k)$ is controlled based on a report from the base station (configuration example 1) and a case where whether or not to use part of group hopping patterns $f_{gh}^{slot}(n_s)$ and $f_{gh}^{PRB}(k)$ is controlled based on a report from the base station (configuration example 2) will be described below.

Configuration Example 1

Configuration example 1 will illustrate a case where group hopping pattern $f_{gh}^{slot}(n_s)$ and $f_{gh}^{PRB}(k)$ are each controlled enabled and disabled based on reports from the base station. The UE controls whether or not to use hopping patterns, on the slot level and/or on the RB level, based on cell-specific RRC parameters (see equations 2).

$$f_{gh}^{slot}(n_s) = \begin{cases} 0 & \text{if group hopping is disabled} \\ \left(\sum_{i=0}^{Z^{slot}-1} c(Z^{slot} * n_s + i) \cdot 2^i\right) \bmod 30 & \text{if group hopping is enabled} \end{cases} \quad \text{(Equation 2)}$$

$$f_{gh}^{PRB}(k) = \begin{cases} 0 & \text{if group hopping is disabled} \\ \left(\sum_{i=0}^{Z^{PRB}-1} c'(Z^{PRB}*k+i) \cdot 2^i\right) \bmod 30 & \text{if group hopping is enabled} \end{cases}$$

Here, $Z^{slot}$ and $Z^{PRB}$ may assume values that are set forth in the specification in advance (for example, the number of scrambling codes), or assume values that are reported from the base station to the UE. As an example, $Z^{slot}=8$ and $Z^{PRB}=10$ may be used. Obviously, the values of $Z^{slot}$ and $Z^{PRB}$ are not limited to these.

In addition, c(i) and c'(i) are pseudo-random sequences, and defined in the specification in advance using predetermined parameters. Note that, here, the configurations (values) of c(i) and c'(i) to apply to each group hopping pattern may be configured common or may be configured different.

The generation of pseudo-random sequences is initialized by $c_{init}$. For example, $c_{init}$ is defined by following equation 3, and the generation of pseudo-random sequences is initialized (or reset) using this $c_{init}$ every predetermined duration (for example, every 10 ms). In this case, the slot index ($n_s$) may also be initialized ($n_s=0$) at the same time. Note that $c_{init}$s that are applied to each individual group hopping pattern may be configured common, or may be configured different. For example, it may be possible to apply varying c(i)s to each group hopping pattern, and use the same $c_{init}$ for initialization (reset).

$$c_{init} = \left\lfloor \frac{N_{ID}^{cell}}{30} \right\rfloor \quad \text{(Equation 3)}$$

In equation 3, $N_{ID}^{cell}$ is a configurable ID, and, for example, a virtual cell ID or a cell ID can be used. Note that the sequence shift pattern ($f_{ss}$) may be determined based on $N_{ID}^{cell}$. For example, in a predetermined sequence of a PUCCH, the sequence shift pattern may be determined based on a predetermined equation (for example, $f_{ss}^{PUCCH}=N_{ID}^{cell} \bmod 30$). Furthermore, a configuration may be employed here in which, in a group number, ($c_{init}+1$) hopping patterns and thirty sequence shift patterns are used.

Referring to equation 2, when group hopping patterns $f_{gh}^{slot}(n_s)$ and $f_{gh}^{PRB}(k)$ are disabled, these hopping patterns assume the value 0. On the other hand, when group hopping patterns $f_{gh}^{slot}(n_s)$ and $f_{gh}^{PRB}(k)$ are enabled, predetermined values are configured. In this case, the group number (predetermined sequence) index is determined based on the value of a group hopping pattern that is configured enabled.

Figures 9A, 9B:
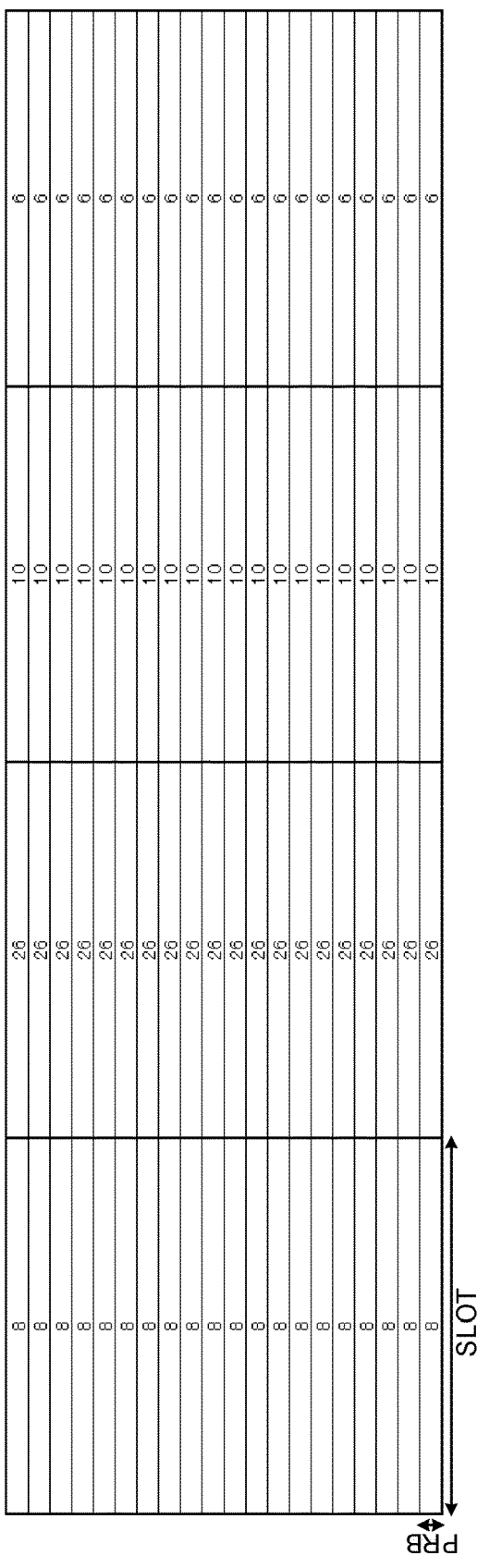
FIGS. 9A and 9B are diagrams to show examples of group numbers (or predetermined sequence indices) corresponding to individual radio resources.

FIG. 9A shows examples of group numbers (u) corresponding to individual radio resources in the event group hopping pattern $f_{gh}^{slot}(n_s)$ is used ($f_{gh}^{slot}(n_s)$ is enabled) and $f_{gh}^{PRB}(k)$ is not used ($f_{gh}^{PRB}(k)$ is disabled). Here, the same group number is assigned to each PRB in a slot. In this case, the group numbers can be randomized at least between slots.

FIG. 9B shows examples of group numbers (u) corresponding to individual radio resources in the event group hopping patterns $f_{gh}^{slot}(n_s)$ and $f_{gh}^{PRB}(k)$ are used ($f_{gh}^{slot}(n_s)$ and $f_{gh}^{PRB}(k)$ are enabled). In this case, the group numbers are randomized between slots and between PRBs. Consequently, it is possible to effectively reduce the interference with neighboring cells.

A plurality of group hopping patterns $f_{gh}^{slot}(n_s)$ and $f_{gh}^{PRB}(k)$ may be configured (enabled or disabled) in a UE at the same time, or may be configured separately (independently). When a plurality of group hopping patterns $f_{gh}^{slot}(n_s)$ and $f_{gh}^{PRB}(k)$ are configured at the same time, for example, the base station configures these group hopping patterns $f_{gh}^{slot}(n_s)$ and $f_{gh}^{PRB}(k)$ enabled or disabled, in a UE, collectively, using one bit. In this case, it is possible to suppress the increase in the number of bits required to send a report.

Alternatively, the base station may separately configure a plurality of group hopping patterns $f_{gh}^{slot}(n_s)$ and $f_{gh}^{PRB}(k)$, either enabled or disabled, in a UE, by using bit fields where RRC signaling varies (or using different RRC signaling). In this case, the base station can flexibly control whether or not to configure each group hopping pattern $f_{gh}^{slot}(n_s)$ or $f_{gh}^{PRB}(k)$.

Configuration Example 2

According to configuration example 2, whether to enable or disable a predetermined group hopping pattern (for example, frequency resource-level hopping pattern $f_{gh}^{PRB}(k)$) is controlled based on a report from the base station. Meanwhile, slot-level hopping pattern $f_{gh}^{slot}(n_s)$ is controlled to be used (or enabled) irrespective of the report from the base station (see equations 4).

$$f_{gh}^{slot}(n_s) = \begin{cases} 0 \\ \left(\sum_{i=0}^{Z^{slot}-1} c(Z^{slot}*n_s+i) \cdot 2^i\right) \bmod 30 \end{cases} \quad \text{(Equation 4)}$$

$$f_{gh}^{PRB}(k) = \begin{cases} 0 & \text{if group hopping is disabled} \\ \left(\sum_{i=0}^{Z^{PRB}-1} c'(Z^{PRB}*k+i) \cdot 2^i\right) \bmod 30 & \text{if group hopping is enabled} \end{cases}$$

In equations 4, when group hopping pattern $f_{gh}^{PRB}(k)$ is disabled, the value is 0. On the other hand, when group hopping pattern $f_{gh}^{PRB}(k)$ is enabled, a predetermined value is configured. Also, group hopping pattern $f_{gh}^{slot}(n_s)$ is configured to a predetermined value regardless of the report from the base station. That is, the UE determines the index of a group number (that is, a predetermined sequence) based at least on slot-level group hopping pattern $f_{gh}^{slot}(n_s)$.

FIG. 9A shows examples of group numbers (u) corresponding to individual radio resources in the event PRB-level group hopping pattern $f_{gh}^{PRB}$ (k) is not used ($f_{gh}^{PRB}$ (k) is disabled). In this case, slot-level group hopping pattern $f_{gh}^{slot}$ ($n_s$) is used, so that the group numbers (u) are randomized among slots. Meanwhile, the same group number is configured between PRBs.

FIG. 9B shows examples of group numbers (u) that correspond to individual radio resources in the event PRB-level group hopping pattern $f_{gh}^{PRB}$ (k) is used ($f_{gh}^{PRB}$ (k) is enabled). In this case, the group numbers are randomized between slots and between PRBs. Consequently, it is possible to effectively reduce the interference with neighboring cells.

(k). An example of the configuration of group hopping pattern $f_{gh}$ ($n_s$) will be described below.

Configuration Example 1 of $f_{gh}$ ($n_s$)

With configuration example 1, whether or not to use a slot-level hopping pattern and a frequency resource-level hopping pattern is controlled based on reports from the base station. For example, if group hopping pattern $f_{gh}$ ($n_s$) is disabled by a report from the base station, its value becomes 0. Also, when group hopping pattern $f_{gh}$ ($n_s$) is enabled by a report from the base station, a predetermined value is configured (see equation 6).

$$f_{gh}^{slot}(n_s) = \begin{cases} 0 & \text{if group hopping is disabled} \\ \left( \sum_{i=0}^{Z^{cell}-1} c(Z^{cell} \cdot N^{RB} \cdot N_{symb}^{UL} \cdot n_s + Z^{cell} \cdot k + i) \cdot 2^i \right) \mod 30 & \text{if group hopping is enabled} \end{cases}$$ (Equation 6)

In this way, by applying a group hopping pattern of a slot level regardless of the report from the base station, it is possible to randomize predetermined sequence at least between slots. By this means, even when a PRB symbol-level group hopping pattern $f_{gh}^{PRB}$ (k) is not used, interference between cells can be suppressed to some extent.

Note that although configuration example 2 has illustrated a case where slot-level group hopping pattern $f_{gh}^{slot}$ ($n_s$) is used regardless of the report from the base station, this is by no means limiting. For example, control may be executed here so that PRB-level group hopping pattern $f_{gh}^{PRB}$ (k) may be used regardless of the report from the base station, and slot-level group hopping pattern $f_{gh}^{slot}$ ($n_s$) is used or not used depending on the report from the base station.

Furthermore, sequence selection example 1 may exert control so that symbol-level group hopping pattern $f_{gh}^{symbol}$ (1) is not used, and slot-level and/or PRB-level group hopping patterns $f_{gh}^{slot}$ ($n_s$) and $f_{gh}^{PRB}$ (k) are used or not used depending on the report from the base station. This allows the same base sequence to be applied to different symbols in the same slot, so that, when PUCCHs or PUSCHs are used over a plurality of symbols, it is possible to increase the multiplexing capacity of PUCCHs or PUSCHs by applying time domain OCCs between symbols.

<Variations>

Also, according to the above description, the group number (u) is configured to accommodate a plurality of group hopping patterns $f_{gh}^{slot}$ ($n_s$) and $f_{gh}^{PRB}$ (k) individually (for example, see equation 1), but this is by no means limiting. For example, the group number (u) may be defined using group hopping pattern $f_{gh}$ ($n_s$) and sequence shift pattern ($f_{ss}$) (see equation 5).

$u=(f_{gh})(n_s)+f_{ss})\mod 30$ (Equation 5)

Also, $f_{gh}$ ($n_s$) is configured to include at least one of a slot index ($n_s$) and a frequency resource (PRB and/or RE) index Here, $Z^{cell}$ may be a value that is provided in advance in the specification (for example, the number of scrambling codes), or may be a value reported from the base station to the UE. For example, $Z^{cell}=20$ may be configured. Obviously, the value of $Z^{cell}$ is not limited to this. In addition, $Z^{cell}$ may assume different values per group hopping, or may assume a common value.

Also, $N^{RB}$ is the number of PRBs and/or REs in a given bandwidth (for example, the cell bandwidth, or the bandwidth configured for the UE), and $N_{symb}^{UL}$ is equivalent to the number of symbols included in one slot, or the number of uplink symbols included in one slot. Other parameters (c(i) and others) can be configured as in equation 1.

The predetermined value when group hopping pattern $f_{gh}$ ($n_s$) is enabled is selected based on the slot index ($n_s$), the frequency resource index (k) and so on. In this case, the group number is randomized between slots and between PRBs. Consequently, it is possible to effectively reduce the interference with neighboring cells.

Configuration Example 2 of $f_{gh}$ ($n_s$)

With configuration example 2, whether or not to apply the PRB-level hopping pattern is controlled based on reports from the base station. For example, when group hopping pattern $f_{gh}$ ($n_s$) is disabled by a report from the base station, the value of $f_{gh}$ ($n_s$) is determined based on the slot index (see equation 7).

On the other hand, when group hopping pattern $f_{gh}$ ($n_s$) is enabled by a report from the base station, the value of $f_{gh}$ ($n_s$) is determined based on the slot index ($n_s$) and the frequency resource index (k). Note that the value for when the group hopping pattern $f_{gh}$ ($n_s$) is disabled may be referred to as the "first configuration value (bit value)," and the value for when the group hopping pattern $f_{gh}$ ($n_s$) is enabled may be referred to as the "second configuration value (bit value)."

$$f_{gh}(n_s) = \begin{cases} \left(\sum_{i=0}^{Z^{cell}-1} c(Z^{cell} \cdot N^{RB} \cdot N_{symb}^{UL} \cdot n_s) \cdot 2^i \right) \bmod 30 & \text{if group hopping is disabled} \\ \left(\sum_{i=0}^{Z^{cell}-1} c(Z^{cell} \cdot N^{RB} \cdot N_{symb}^{UL} \cdot n_s + Z^{cell} \cdot k + i) \cdot 2^i \right) \bmod 30 & \text{if group hopping is enabled} \end{cases}$$ (Equation 7)

In this case, regardless of the report from the base station, the group number can be determined using the slot index (by applying a slot-level hopping pattern). By this means, even when a PRB symbol-level group hopping pattern is not used, interference between cells can be suppressed to some extent.

Note that, although configuration example 2 has illustrated a case where slot-level group hopping is used regardless of the report from the base station, this is by no means limiting. For example, in equation 7, the slot index and the frequency resource index may be replaced.

Sequence Selection Example 2

According to sequence selection example 2, a plurality of (for example, two) sequences are always selected per slot. The UE may select the sequence to use from a plurality of selected sequences (also referred to as "sequence candidate") when necessary. Note that, in the following description, parts that are different from sequence selection example 1 will be explained, and the other parts can be implemented in the same way as in sequence selection 1.

The group number (u) may be defined by an equation that contains at least one of the slot index, the frequency resource index (PRB and/or RE) and the hop index (see equation 8).

$$u = (f_{gh}^{slot}(n_s) + f_{gh}^{PRB}(k) + f_{gh}^{hop}(p) + f_{ss}) \bmod 30$$ (Equation 8)

Equation 8 is an equation for use for determining the group number (u) that corresponds to slot $\#n_s$, minimum frequency resource index $\#k$ (the lowest PRB and/or RE index) where a PUCCH and/or a PUSCH are allocated, and hop index $\#p$. Here, the group number (u) is defined using group hopping patterns $f_{gh}^{slot}(n_s)$, $f_{gh}^{PRB}(k)$ and $f_{gh}^{hop}(p)$, and a sequence shift pattern ($f_{ss}$).

The group hopping pattern $f_{gh}^{hop}(p)$ contains hop indices. The hop indices may be numbered according to the order in a hop. For example, in the event a frequency hops once, the index value of the first half part of this frequency hop may be set to 0, and the index value of the second half part of this frequency hop may be set to 1. Note that the equation for the group number of a predetermined sequence is not limited to above equation 8. A configuration that does not include part of the group hopping pattern parameters (for example, $f_{gh}^{PRB}(k)$ and/or $f_{gh}^{slot}(n_s)$) may be used. Alternatively, a configuration to include other parameters may be used.

In this way, by selecting the group number (u) taking into account the indices of hopping parts where the PUCCH, the PUSCH or the DMRS is allocated, the predetermined sequence can be randomized between hops. Furthermore, by selecting the group number index based on hop indices (here, 0 and 1), a number of predetermined sequences (predetermined sequence candidates) to match the number of hops (for example, (the number of hops+1) predetermined sequences) can be selected.

For example, when two hop indices 0 and 1 are used, in each slot, two predetermined sequences (also referred to as "predetermined sequence candidates") can always be calculated. When one sequence is used per slot (for example, when frequency hopping is disabled in the first aspect, or the second aspect), one predetermined sequence to be actually used may be selected from predetermined sequence candidates. For example, the UE may select a group number (predetermined sequence) determined from a small value (for example, 0) of the hop index. Alternatively, the value of any hop index may be randomly selected and used.

A configuration may be employed here in which some or all of the group hopping patterns $f_{gh}^{slot}(n_s)$, $f_{gh}^{PRB}(k)$ and $f_{gh}^{hop}(p)$ can be configured enabled or disabled based on reports from the base station. Alternatively, a configuration may be adopted in which a predetermined group hopping pattern (for example, $f_{gh}^{hop}(p)$) is used regardless of reports from the base station. To be more specific, it is possible to use a mathematical formula here which adds the hop index (group hopping pattern $f_{gh}^{hop}(p)$) to the slot index and the PRB index in equations 2, 4, 6, and 7, which have been shown in sequence selection method 1.

FIG. 10A shows examples of group numbers (u) that correspond to individual radio resources in the event group hopping patterns $f_{gh}^{slot}(n_s)$ and $f_{gh}^{hop}(p)$ are used (that is, $f_{gh}^{slot}(n_s)$ and $f_{gh}^{hop}(p)$ are enabled) and $f_{gh}^{PRB}(k)$ is not used (that is, $f_{gh}^{PRB}(k)$ is disabled). Here, the same group number is assigned to each PRB in a slot. In this case, the group number (predetermined sequence index) can be randomized at least between slots and between hops.

In FIG. 10A, different group numbers are assigned between frequency hops (in one slot). In this case, two group number (predetermined sequence) candidates (for example, 26, 12, etc.) are defined in one slot. The UE has to select the predetermined sequence to actually use from predetermined sequence candidates depending on the number of predetermined sequences to use in each slot.

FIG. 10B shows examples of group numbers (u) that correspond to individual radio resources when group hopping patterns $f_{gh}^{slot}(n_s)$, $f_{gh}^{hop}(p)$ and $f_{gh}^{PRB}(k)$ are used (that is, $f_{gh}^{slot}(n_s)$, $f_{gh}^{hop}(p)$ and $f_{gh}^{PRB}(k)$ are enabled). In this case, the group number is randomized between slots, between hops and between PRBs. Consequently, it is possible to effectively reduce the interference with neighboring cells.

Sequence Selection Example 3

In sequence selection example 3, one or a plurality of group number (predetermined sequence) indices are selected based on the index of a predetermined symbol (for example, the top symbol) where the PUCCH, the PUSCH or the DMRS is allocated. Note that, in the following description, parts that are different from sequence selection example 1 and 2 will be explained, and the other parts are the same as sequence selection examples 1 and 2.

The group number (u) may be defined using an equation that contains at least one of the slot index, the frequency resource (PRB and/or RE) index, and the symbol index (see equation 9).

$$u = (f_{gh}^{slot}(n_s) + f_{gh}^{PRB}(k) + f_{gh}^{symbol}(l) + f_{ss}) \bmod 30$$ (Equation 9)

Equation 9 is an equation for use for determining the group number (u) that corresponds to slot #$n_s$, minimum frequency resource index #k (the lowest PRB and/or RE index) where a PUCCH and/or a PUSCH are allocated, and symbol #1. Here, the group number (u) is defined using group hopping patterns $f_{gh}^{slot}$ ($n_s$), $f_{gh}^{PRB}$ (k) and $f_{gh}^{symbol}$ (l), and a sequence shift pattern ($f_{ss}$).

The group hopping pattern $f_{gh}^{symbol}$ (l) contains symbol indices (for example, 0 to 13). Note that the equation for the group number of a predetermined sequence is not limited to above equation 9. A configuration that does not include part of the group hopping pattern parameters (for example, $f_{gh}^{PRB}$ (k) and/or $f_{gh}^{slot}$ ($n_s$)) may be used. Alternatively, a configuration to include other parameters may be used.

By selecting the group number (u) taking into account the symbols where the PUCCH, the PUSCH or the DMRS is allocated (for example, the top symbol index), the predetermined sequence can be randomized between symbols.

In the event one predetermined sequence is used per slot (for example, if frequency hopping is disabled in the first aspect, or the second aspect), the group number (predetermined sequence) that is calculated from the index of the top allocated symbol may be used regardless of whether or not frequency hopping is used. Meanwhile, when a plurality of (for example, two) predetermined sequences are used for each slot, a plurality of group numbers (predetermined sequences) that are each calculated from the index of the top allocated symbol in each frequency hop may be used.

A configuration may be employed here in which some or all of the group hopping patterns $f_{gh}^{slot}$ ($n_s$), $f_{gh}^{PRB}$ (k) and $f_{gh}^{symbol}$ (l) can be configured enabled or disabled based on reports from the base station. Alternatively, a configuration may be adopted in which a predetermined group hopping pattern (for example, $f_{gh}^{symbol}$ (l)) is used regardless of reports from the base station. To be more specific, it is possible to use a mathematical formula here which adds the symbol index (group hopping pattern $f_{gh}^{symbol}$ (l)) to the slot index and the PRB index in equations 2, 4, 6, and 7, which have been shown in sequence selection method 1.

Figures 11A, 11B:
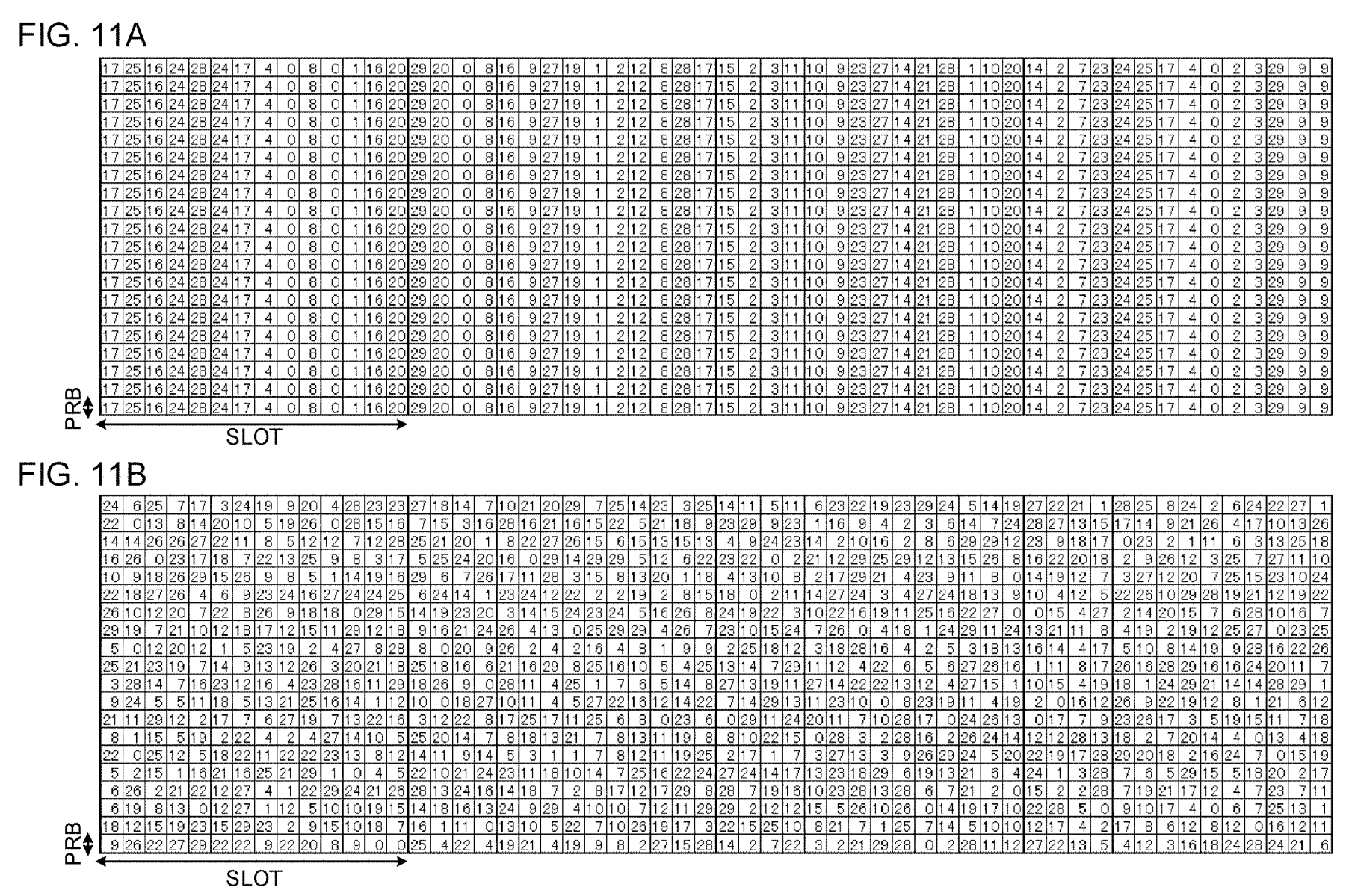

FIG. 11A shows examples of group numbers (u) that correspond to individual radio resources in the event group hopping patterns $f_{gh}^{slot}$ ($n_s$) and $f_{gh}^{symbol}$ (l) are used (that is, $f_{gh}^{slot}$ ($n_s$) and $f_{gh}^{symbol}$ (l) are enabled) and $f_{gh}^{PRB}$ (k) is not used (that is, $f_{gh}^{PRB}$ (k) is disabled). Here, the same group number is assigned to each PRB in symbols in each slot. In this case, the group number can be randomized at least between slots and between symbols.

FIG. 11B shows examples of group numbers (u) that correspond to individual radio resources when group hopping patterns $f_{gh}^{slot}$ ($n_s$), $f_{gh}^{symbol}$ (l) and $f_{gh}^{PRB}$ (k) are used (that is, $f_{gh}^{slot}$ ($n_s$), $f_{gh}^{symbol}$ (l) and $f_{gh}^{PRB}$ (k) are enabled). In this case, the group number is randomized between slots, between symbols and between PRBs. Consequently, it is possible to effectively reduce the interference with neighboring cells.

The UE may use the group number (predetermined sequence index) corresponding to the top symbol (and the PRB with the minimum index), in the field in which the PUCCH, the PUSCH or the DMRS is allocated.

For example, assume the case where a PUCCH to which frequency hopping is not applied is allocated (see FIG. 12A). Note that, FIG. 12A shows a case where a long PUCCH is allocated to the duration from the third symbol from the beginning of a predetermined slot to the last symbol (that is, a duration of twelve symbols) and a case where a short PUCCH is allocated to the duration of two symbols from the end of another slot.

In FIG. 12A, the group number that corresponds to the top symbol in the field in which the long PUCCH is allocated is #12. The UE uses a (one) predetermined sequence that is selected based on this group number #12 to transmit the long PUCCH. Also, in FIG. 12A, the group number corresponding to the first symbol in the field in which the short PUCCH is allocated and corresponding to the PRB with the minimum index is #14. The UE uses a (one) predetermined sequence that is selected based on this group number #14 to transmit the short PUCCH.

In this way, a predetermined sequence is selected based on the index of a predetermined symbol (for example, the top symbol) where a signal and/or a channel are allocated, so that the same sequence can be applied to the signal and/or the channel. Thus, time domain OCCs can be applied.

For example, in FIG. 12A, the same predetermined sequence (here, a sequence determined from group number #12) is applied to a short PUCCH of two symbols. By this means, a time domain OCC (for example, OCC length=2) can be applied to the predetermined sequence of the short PUCCH, so that the UE multiplexing capacity can be increased.

Furthermore, assume a case where a PUCCH to which frequency hopping is applied is allocated (see FIG. 12B). Note that, FIG. 12B shows a case where the first half part of a frequency hop is allocated to the duration from the third symbol from the beginning of a predetermined slot to the eighth symbol (a duration of six symbols). Also, a case is shown here where the second half part of the frequency hop is allocated to the duration (six symbols) from the ninth symbol from the beginning of the predetermined slot to the fourteenth symbol.

Also, FIG. 12B shows a case where the first half part of a frequency hop in the short PUCCH is allocated to the second symbol from the end of another slot, and where the second half part of the frequency hop of the short PUCCH is allocated to the first symbol from the end of another slot.

In this case, the group number that corresponds to the top symbol in the first half part of the frequency hop in the long PUCCH is #22, and the group number that corresponds to the top symbol in the second half part is #9. Therefore, the UE calculates a plurality of (two) candidates for a predetermined sequence that are each selected based on group numbers #22 and #9, and the UE uses one or both of the predetermined sequence candidates depending on the number of sequences to be actually used in the slot.

Also, the group number that corresponds to the top symbol in the first half part of the frequency hop of the short PUCCH and corresponding to the PRB of the minimum index is #11, and the group number of the second half part is #22. Therefore, the UE calculates a plurality of (two) candidates for each predetermined sequence that are selected based on these group numbers #11 and #22, and uses one or both of the predetermined sequence candidates depending on the number of sequences to be actually used in the slot.

(Fourth Aspect)

According to a fourth aspect of the present invention, a configuration in which at least a symbol index (symbol-level CS hopping) and/or a frequency resource index (frequency resource-level CS hopping) are applied to a cyclic shift (CS) that is applied to a predetermined sequence. Note that the fourth aspect can be appropriately used for predetermined sequences in the first to the third aspect described above.

The UE selects a cyclic shift (CS) to apply to a predetermined sequence by using at least one of the symbol index and the frequency resource index. For example, the UE selects the CS index based on slot-level and symbol-level hopping (a slot index and a symbol index). Alternatively, the UE may select the CS index based on hopping (frequency resource index) on a frequency resource (PRB and/or RE) level, in addition to slot-level and symbol-level hopping.

Examples of a case in which CS hopping is performed on a slot level and a symbol level (CS hopping configuration 1) and a case in which CS hopping is performed on a slot level, a symbol level and a PRB level (CS hopping configuration 2) will be described below. Note that the CS according to the fourth aspect can be applied to predetermined PUCCH formats. For example, in each symbol, the cyclic shift described below is applied as cyclic shift for base sequences in at least one of PUCCH formats 0, 1, 3 and 4. Note that PUCCH formats 3 and 4 can be applied at least to DMRS symbols.

<CS Hopping Configuration 1>

In CS hopping configuration 1, the CS index hops on a slot level and a symbol level. For example, the UE uses following equations 10 to select the CS index ($\alpha(n_s,l)$) to apply to a predetermined sequence. Note that equations 10 are used to select the CS index corresponding to slot #$n_s$ and symbol #1.

$$n_{cs}^{cell}(n_s,l) = \Sigma_{i=0}^{Z^{cell}-1} c(Z^{cell} \cdot N_{symb}^{UL} \cdot n_s + Z^{cell} \cdot l + i) \cdot 2^i$$

$$n_{cs}(n_s,l) = [n_{cs}^{cell}(n_s,l) + n'(n_s)] \bmod N_{sc}^{RB}$$

$$\alpha(n_s,l) = 2\pi \cdot n_{cs}(n_s,l)/N_{sc}^{RB} \qquad \text{(Equations 10)}$$

Here, $n_{CS}^{cell}(n_s,l)$ is a CS hopping pattern that is common to cells (for example, common to predetermined UE groups). $Z^{cell}$ may be a value that is defined in the specification in advance (for example, the number of scrambling codes) or may be a value that is reported from the base station to the UE. As an example, $Z^{cell}=20$ may be configured. Obviously, the value of $Z^{cell}$ is not limited to this. In addition, $Z^{cell}$ may assume different values per group hopping, or may assume a common value.

$n'(n_s)$ is a value that is configured in advance (for example, the initial value of cyclic shift). For example, $n'(n_s)$ may be a value that is reported explicitly out of a PUCCH resource set that is configured by combination of RRC and DCI, a value that is selected based on the control channel element (CCE) index of a downlink control channel (PDCCH), or a value that is selected based on the PRB and/or RE index of a downlink shared channel (PDSCH).

$N_{SC}^{RB}$ corresponds to the number of subcarriers (or REs) per PRB, and, for example, $N_{SC}^{RB}=12$ holds. $N_{symb}^{UL}$ is the number of UL durations (the number of UL symbols) or slots.

In addition, c(i) is a pseudo-random sequence and is defined in the specification in advance using predetermined parameters. The generation of pseudo-random sequences is initialized by $c_{init}$. For example, $c_{init}$ can be determined based on a configurable ID ($N_{ID}^{cell}$). A virtual cell ID or cell ID can be used for $N_{ID}^{cell}$, and $c_{init}=N_{ID}^{cell}$ is also possible. c(i) may be configured to be initialized (or reset) using $c_{init}$ for every predetermined duration (for example, every 10 ms).

The CS index (for example, $\alpha(n_s,l)$) that is actually used by the UE can be determined based on a CS index ($n'(n_s)$) that is configured based on a predetermined method, and a cell-common CS hopping pattern ($n_{CS}^{cell}(n_s,l)$).

In CS hopping configuration 1, the slot index ($n_s$) and the symbol index(l) are included in equations 10. Therefore, the CS index hops at a slot level and at a symbol level.

Figure 13:
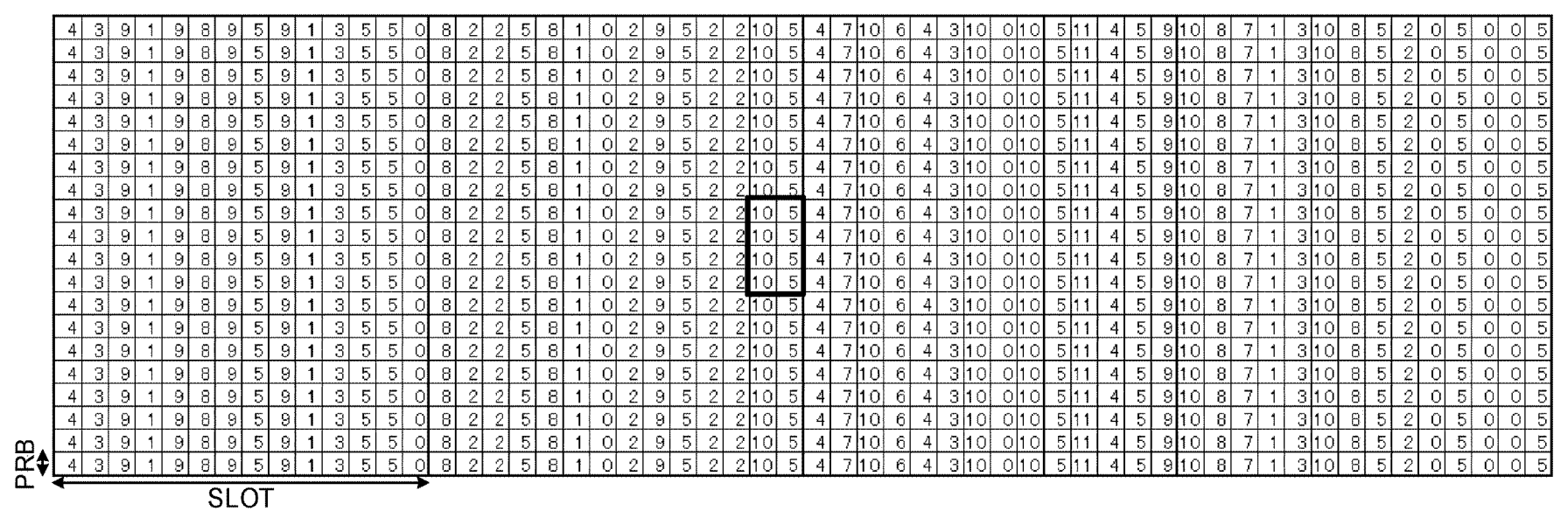

FIG. 13 shows examples of CS indices corresponding to individual radio resources when the CS index hops at a slot level and at a symbol level. In this case, the CS index is randomized between slots and between symbols. Consequently, it is possible to effectively reduce the interference with neighboring cells.

Also, the UE may use the CS index corresponding to the first symbol (and the PRB with the minimum index) in the field where the PUCCH, the PUSCH or the DMRS is allocated. For example, FIG. 13 assumes a case where a PUCCH (short PUCCH) to which frequency hopping is not applied is allocated. FIG. 13 shows a case where a short PUCCH is allocated to the duration of two symbols from the end of a predetermined slot.

To be more specific, the CS index corresponding to the first symbol in the field in which the short PUCCH is allocated and corresponding to the PRB with the minimum index is #10. In this case, the UE may apply CS index 10 to a predetermined sequence. For example, in the event the short PUCCH shown in FIG. 12A is used, the UE may apply CS index #10 to the base sequence obtained based on group number #14. Note that, for a long PUCCH, the CS index may be selected and used in the same manner.

Alternatively, the UE may use a different CS index for each symbol in the field where the PUCCH, the PUSCH or the DMRS is allocated. For example, the UE may use the CS index corresponding to the PRB of the minimum index in each symbol where the PUCCH is allocated. For example, in FIG. 13, CS index #10 is used in the second symbol from the end, and CS index #5 is used in the first symbol from the end. Even when varying CS indices are used between symbols, if the sequences are the same, OCCs in the time domain can be applied. Interference between symbols can be randomized and reduced by using different CS indices between symbols. Note that, for a long PUCCH, the CS index may be selected and used in the same manner.

<CS Hopping Configuration 2>

In CS hopping configuration 2, the CS index hops on a slot level, a symbol level and a frequency resource level (PRB and/or RE). For example, the UE uses following equations 11 to select the CS index ($\alpha(n_s,l,k)$) to apply to a predetermined sequence. Note that equations 11 are used to select the CS index that corresponds to slot #$n_s$, symbol #1, minimum frequency resource index #k (the lowest PRB and/or RE index) where the PUCCH and/or the PUSCH are allocated.

$$n_{cs}^{cell}(n_s,l,k) = \Sigma_{i=0}^{Z^{cell}-1} c(Z^{cell} \cdot N^{RB} \cdot N_{symb}^{UL} \cdot n_s + Z^{cell} N_{RB} \cdot l + Z^{cell} \cdot k + i) \cdot 2^i$$

$$n_{cs}(n_s,l,k) = [n_{cs}^{cell}(n_s,l,k) + n'(n_s)] \bmod N_{sc}^{RB}$$

$$\alpha(n_s,l,k) = 2\pi \cdot n_{cs}(n_s,l,k)/N_{sc}^{RB} \qquad \text{(Equations 11)}$$

Here, $N^{RB}$ is the number of PRBs and/or REs in a predetermined bandwidth (for example, the cell bandwidth or the bandwidth configured for the UE). The other parameters ($Z^{cell}$ and others) are the same as in equations 10.

In equations 11, k, which represents the frequency resource index (for example, the PRB index), is added compared to equations 10. That is, according to CS hopping configuration 2, the slot index ($n_s$), the symbol index (l), and the frequency resource index (k) are included in equations 11. Accordingly, the CS index hops at a slot level, a symbol level and a frequency resource level.

Figure 14:
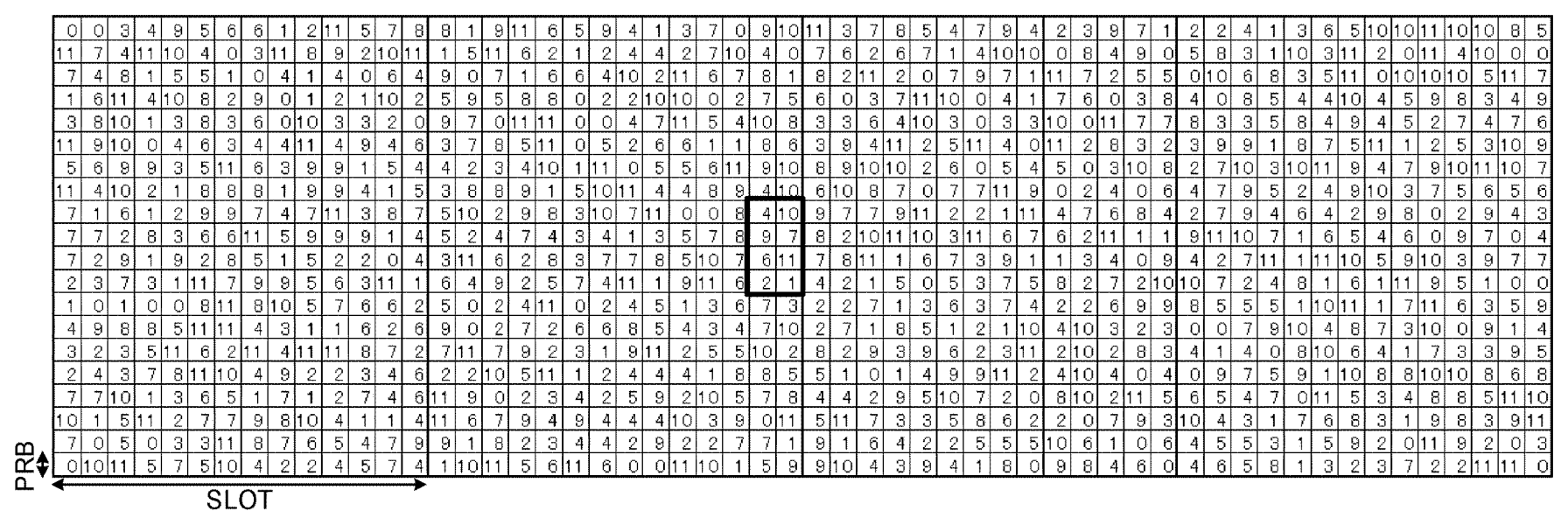

FIG. 14 shows examples of CS indices that correspond to individual radio resources when the CS index hops on a slot level, a symbol level and a frequency resource level. In this case, the CS index is randomized between slots, between symbols and between PRBs. Consequently, it is possible to effectively reduce the interference with neighboring cells.

Also, the UE may use the CS index corresponding to the first symbol (and the PRB with the minimum index) in the field where the PUCCH, the PUSCH or the DMRS is allocated. For example, FIG. 14 assumes a case where a PUCCH (short PUCCH) to which frequency hopping is not applied is allocated. FIG. 14 shows a case where a short PUCCH is allocated to the duration of two symbols from the end of a predetermined slot.

To be more specific, the CS index corresponding to the first symbol in the field in which the short PUCCH is allocated and corresponding to the PRB with the minimum index is #2. In this case, the UE may apply CS index #2 to the predetermined sequence. For example, in the event the short PUCCH shown in FIG. 12A is used, the UE may apply CS index #2 to the base sequence obtained based on group number #14. Note that, for a long PUCCH, the CS index may be selected and used in the same manner.

Alternatively, the UE may use a different CS index for each symbol in the field where the PUCCH, the PUSCH or the DMRS is allocated. For example, the UE may use the CS index corresponding to the PRB of the minimum index in each symbol where the PUCCH is allocated. For example, in FIG. 14, CS index #2 is used in the second symbol from the end, and CS index #1 is used in the first symbol from the end. Even when varying CS indices are used between symbols, if the sequences are the same, OCCs in the time domain can be applied. Interference between symbols can be randomized and reduced by using different CS indices between symbols. Note that, for a long PUCCH, the CS index may be selected and used in the same manner.

<Variation>

As in the sequence hopping (group hopping) described in the third aspect, a configuration may be employed in which whether or not CS hopping is used (enabled or disabled) can be configured based on reports from the base station.

Also, the base station may configure (enable or disable) sequence hopping and CS hopping in the UE at the same time, or configure these separately (independently). For example, the base station configures sequence hopping and CS hopping enabled or disabled, in the UE, collectively, using higher layer signaling. In this case, it is possible to reduce the increase in the number of bits required to send a report.

Alternatively, the base station may configure sequence hopping and CS hopping enabled or disabled, in the UE, separately, using bit fields where higher layer signaling varies (or using varying higher layer signaling). In this case, the base station can flexibly control whether or not to configure sequence hopping and CS hopping.

(Radio Communication System)

Now, the structure of a radio communication system according to one embodiment of the present invention will be described below. In this radio communication system, communication is performed using one or a combination of the radio communication methods according to the herein-contained embodiments of the present invention.

Figure 15:
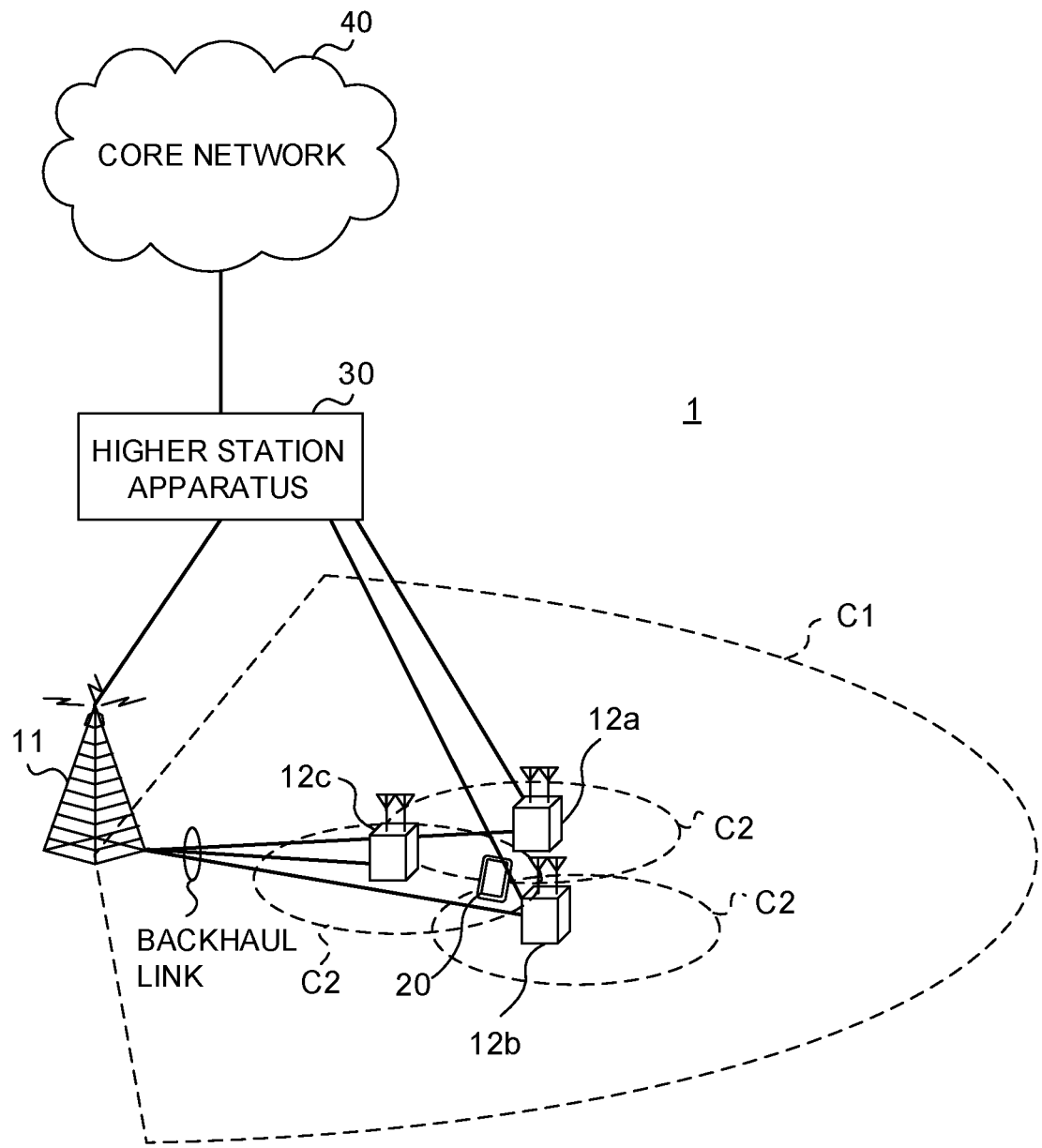
FIG. 15 is a diagram to show an example of a schematic structure of a radio communication system according to the present embodiment.

FIG. 15 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1 covering a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement, number and so on of cells and user terminals 20 are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and other radio access schemes can be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, and so on, is communicated by the PDCCH.

Note that scheduling information may be reported via DCI. For example, the DCI to schedule receipt of DL data may be referred to as "DL assignment," and the DCI to schedule transmission of UL data may be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication systems 1, cell-specific reference signal (CRSs), channel state information reference signal (CSI-RSs), demodulation reference signal (DMRSs), positioning reference signal (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that, DMRSs may be referred to as "user terminal-specific reference signals (UE-specific Reference Signals)." Also, the reference signals to be communicated are by no means limited to these.

<Radio Base Station>

Figure 16:
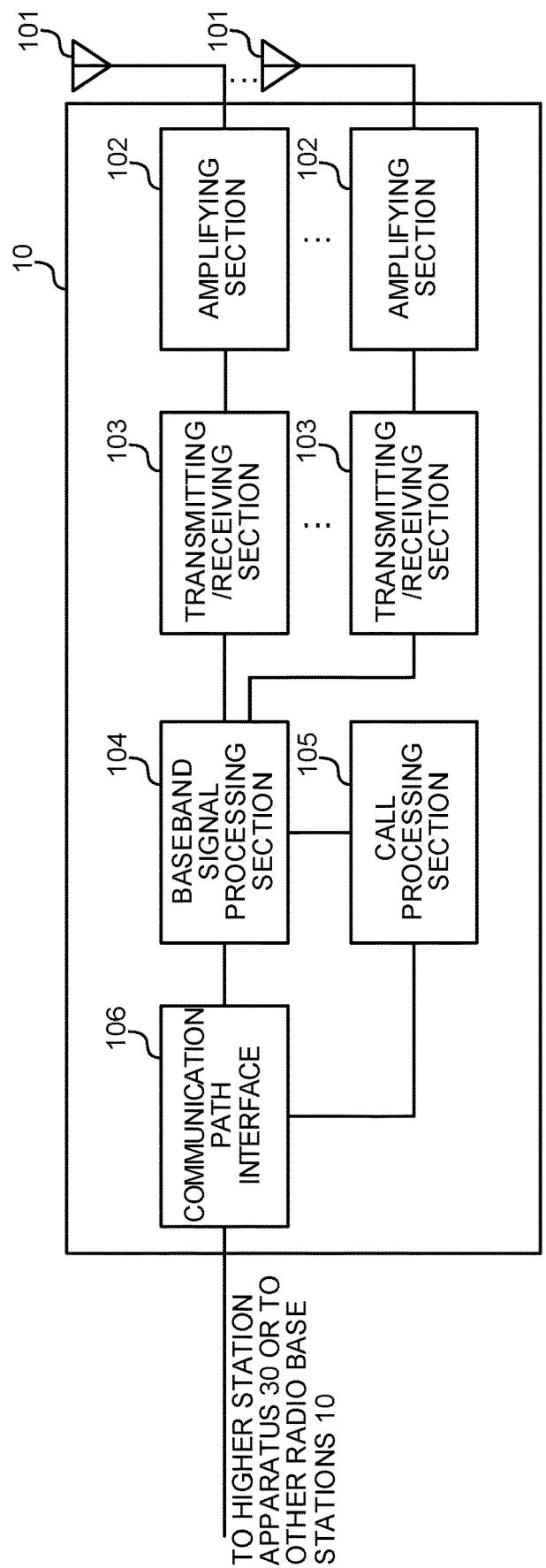
FIG. 16 is a diagram to show an example of an overall structure of a radio base station according to the present embodiment.

FIG. 16 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

In addition, the transmitting/receiving sections 103 receive the demodulation reference signal for a UL channel and/or a PUCCH, to which a predetermined sequence is applied. In addition, the transmitting/receiving sections 103 command whether or not to use (enable or disable) a predetermined group hopping pattern by way of higher layer signaling (for example, cell-specific and/or UE-specific RRC signaling (RRC parameter), broadcast signals, etc.). In addition, the transmitting/receiving sections 103 may command whether or not to use (enable or disable) CS hopping (CS index hopping) by way of higher layer signaling.

Figure 17:
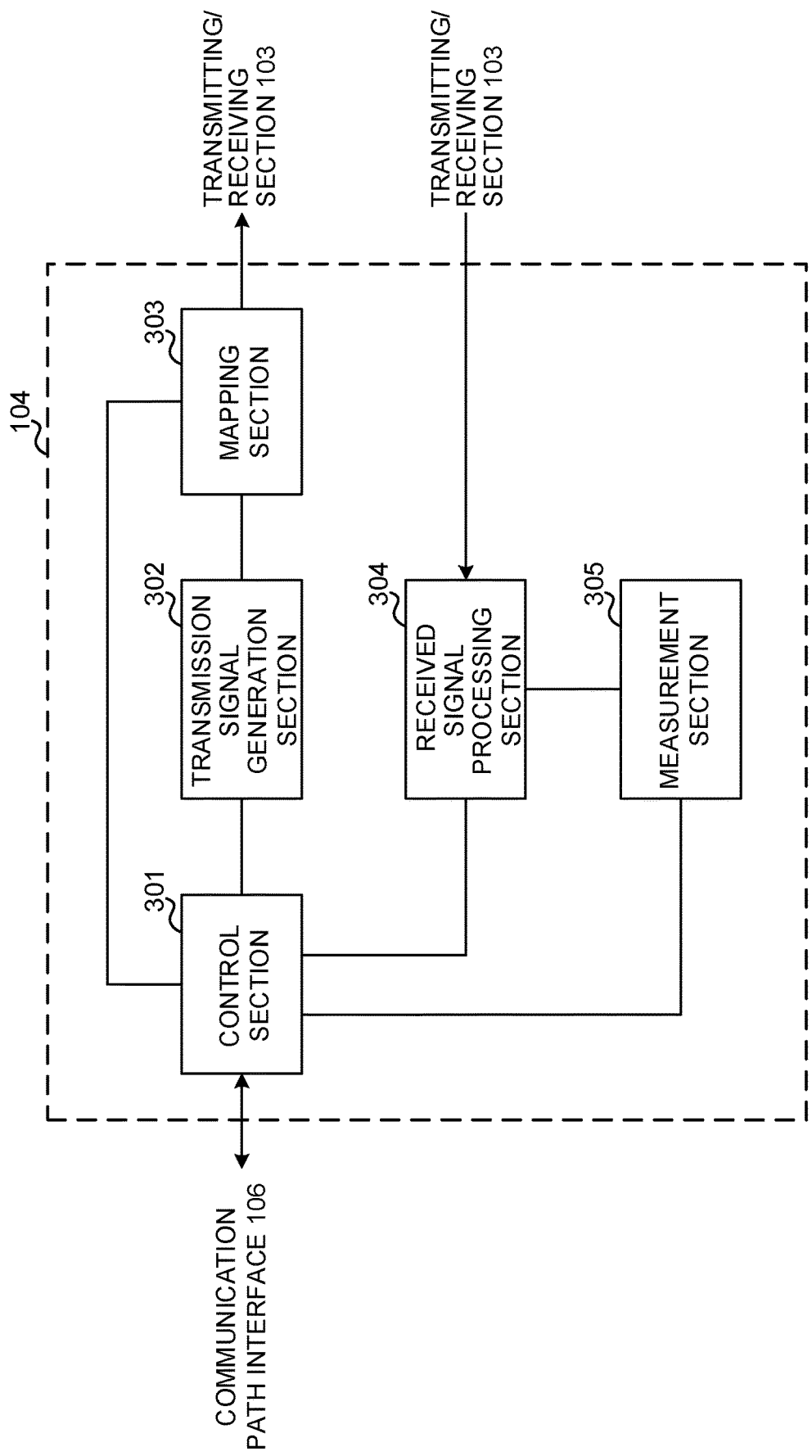
FIG. 17 is a diagram to show an example of a functional structure of a radio base station according to the present embodiment.

FIG. 17 is a diagram to show an example of a functional structure of a radio base station according to the present embodiment. Note that, although this example will primarily show functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH), and downlink control signals (for example, signals that are transmitted in the PDCCH and/or the EPDCCH, such as delivery acknowledgement information). The control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DM-RS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), uplink reference signals, and/or other signals.

In addition, the control section 301 controls whether or not to use (enable or disable) a predetermined group hopping pattern. Furthermore, the control section 301 may control whether or not to use (enable or disable) CS hopping (CS index hopping).

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generation apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) reported from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

(User Terminal)

Figure 18:
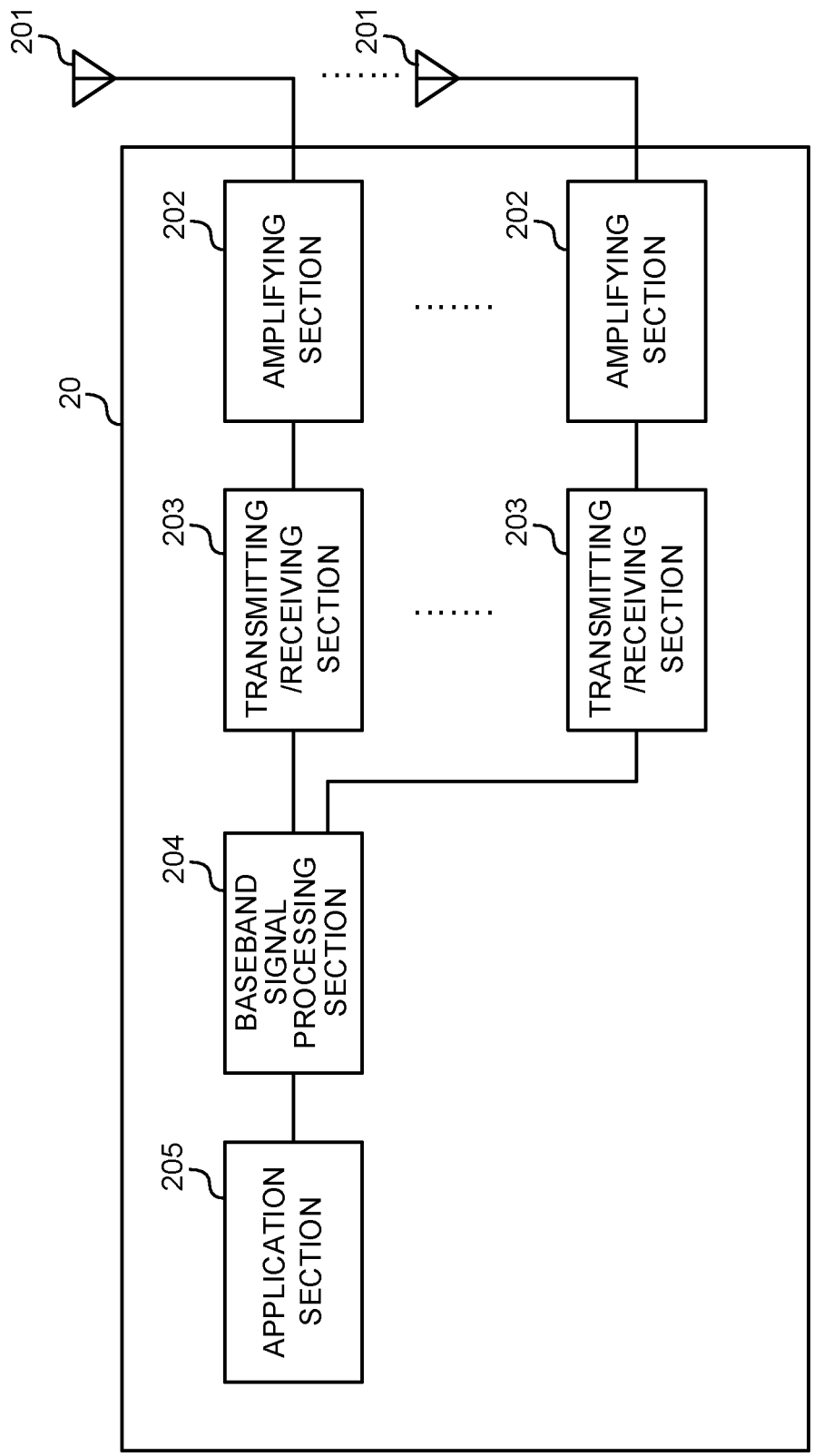
FIG. 18 is a diagram to show an example of an overall structure of a user terminal according to the present embodiment.

FIG. 18 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

In addition, the transmitting/receiving sections 203 transmit a demodulation reference signal and/or a PUCCH, to which a predetermined sequence is applied. In addition, the transmitting/receiving sections 203 receive information as to whether or not a predetermined group hopping pattern is used (enabled or disabled) by way of higher layer signaling (for example, cell-specific and/or UE-specific RRC signaling (RRC parameter), broadcast signals, etc.). Also, the transmitting/receiving sections 203 may receive information regarding whether or not CS hopping (CS index hopping) is used (enabled or disabled) by higher layer signaling.

Figure 19:
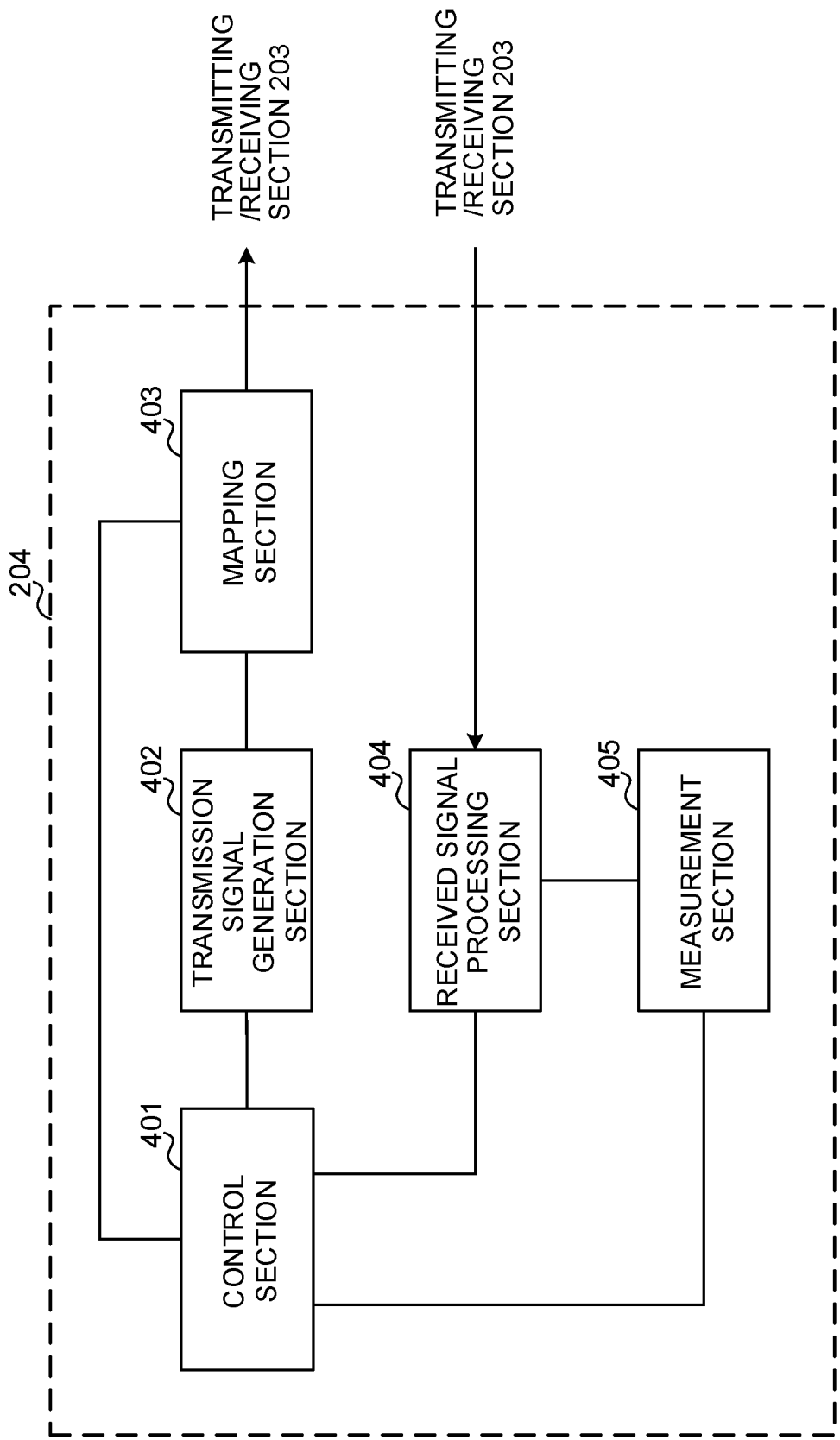
FIG. 19 is a diagram to show an example of a functional structure of a user terminal according to the present embodiment.

FIG. 19 is a diagram to show an example of a functional structure of a user terminal according to the present embodiment. Note that, although this example will primarily show functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations may be included in the user terminal 20, and some or all of the configurations need not be included in the baseband signal processing section 204.

The control section 401 controls the whole of the user terminal 20. The control section 401 can be constituted by a controller, a control circuit or control apparatus that can be described based on general understanding of the technical field to which the present invention pertains.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 also controls a predetermined sequence (for example, the number of predetermined sequences and/or the method of generating predetermined sequences) to use in a predetermined slot, based on whether or not frequency hopping is used in a predetermined slot (see FIG. 5). Alternatively, the control section 401 commonly controls a predetermined sequence (for example, the number of predetermined sequences and/or the generation method of generating predetermined sequences) for use in a predetermined slot regardless of whether or not frequency hopping is used in a predetermined slot (see FIG. 8).

In addition, the control section 401 may select a predetermined sequence to use from among a plurality of predetermined sequences that are obtained in each slot based at least on the frequency hop index. The control section 401 may also select a predetermined sequence based at least on the index of a predetermined symbol where a demodulation reference signal and/or an uplink control channel are allocated. Also, the control section 401 may select a predetermined sequence based at least on the index of a frequency resource where a demodulation reference signal and/or an uplink control channel are allocated.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving section 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 output the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 20:
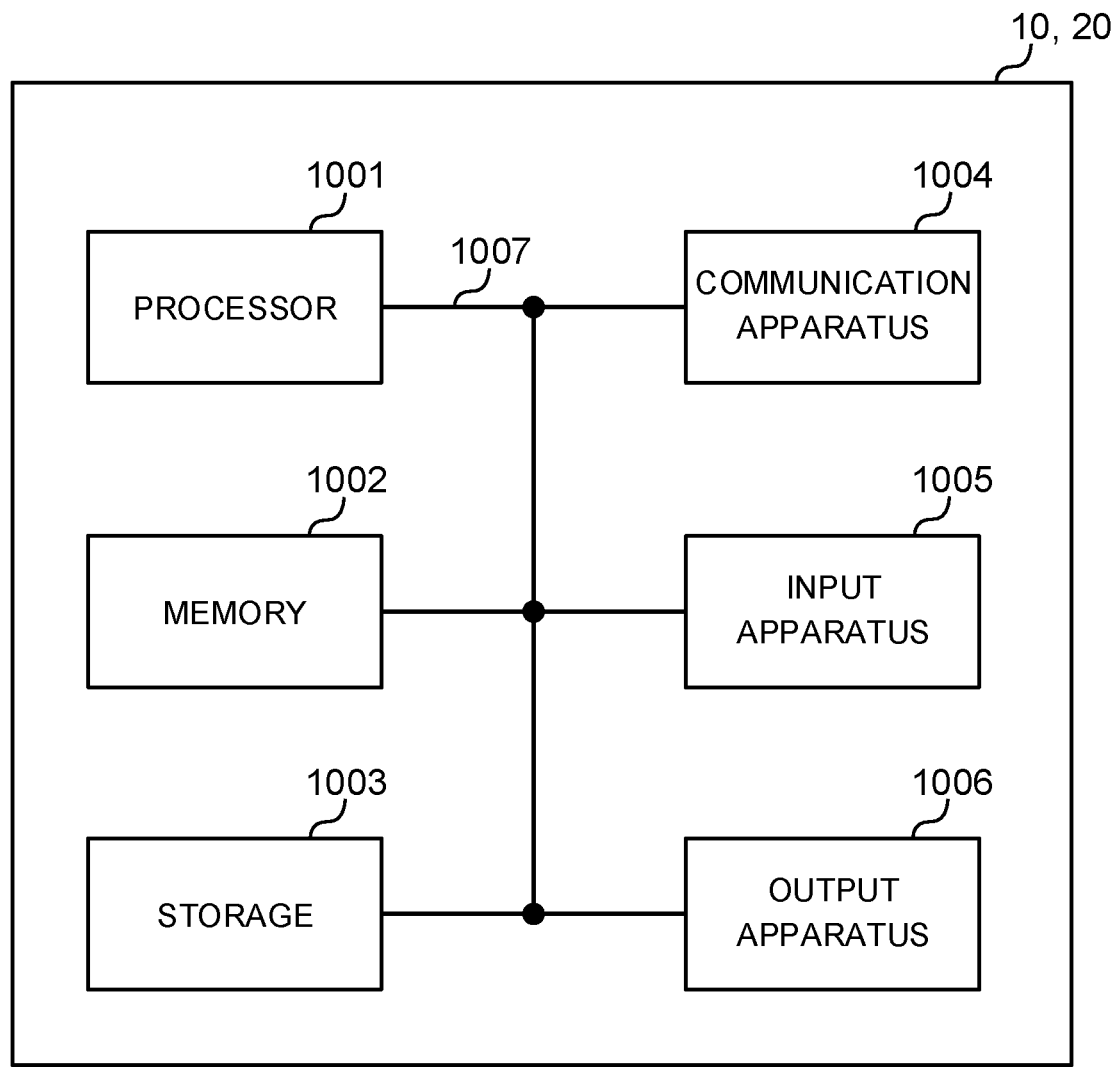
FIG. 20 is a diagram to show an example of a hardware structure of a radio base station and a user terminal according to the present embodiment.

For example, the radio base station, user terminals and so on according to embodiments of the present invention may function as a computer that executes the processes of the radio communication method of the present invention. FIG. 20 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented using other applicable information. For example, a radio resource may be specified by a predetermined index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Deviceto-Device)). In this case, user terminals 20 may have the functions of the radio base stations 10 described above. In addition, terms such as "uplink" and "downlink" may be interpreted as "side. For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access."

As used herein, when two elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a transmitter that transmits an uplink control channel to which a given sequence corresponding to a given group is applied; and
   a processor that determines the given group based on whether the uplink control channel is subjected to frequency hopping.

2. The terminal according to claim 1, wherein the processor determines the given group based on a frequency hopping index.

3. The terminal according to claim 2, wherein when the frequency hopping is enabled, the processor applies a corresponding first frequency hopping index to first hopping and applies a corresponding second frequency hopping index to second hopping.

4. The terminal according to claim 3, wherein when the frequency hopping is disabled, the processor applies the first frequency hopping index.

5. The terminal according to claim 2, wherein the processor determines the given group based on a slot number in addition to the frequency hopping index.

6. The terminal according to claim 1, wherein the processor controls a number of group numbers to apply in a given slot based on whether the frequency hopping is enabled.

7. A radio communication method for a terminal, comprising:
   determining a given group based on whether an uplink control channel is subjected to frequency hopping; and
   transmitting the uplink control channel to which a given sequence corresponding to the given group is applied.

8. A terminal comprising:
   a transmitter that transmits a demodulation reference signal to which a given sequence corresponding to a given group is applied; and
   a processor that determines the given group based on a symbol number of the demodulation reference signal,
   wherein the processor determines at least the given group based on a first symbol number of the demodulation reference signal.

9. The terminal according to claim 8, wherein the processor determines the given group based on a slot number in addition to the symbol number of the demodulation reference signal.

10. A radio communication method for a terminal, comprising:
    determining a given group based on a symbol number of a demodulation reference signal; and
    transmitting the demodulation reference signal to which a given sequence corresponding to the given group is applied,
    wherein the terminal further determines at least the given group based on a first symbol number of the demodulation reference signal.

11. The terminal according to claim 3, wherein the processor determines the given group based on a slot number in addition to the frequency hopping index.

12. The terminal according to claim 4, wherein the processor determines the given group based on a slot number in addition to the frequency hopping index.

13. The terminal according to claim 2, wherein the processor controls a number of group numbers to apply in a given slot based on whether the frequency hopping is enabled.

14. The terminal according to claim 3, wherein the processor controls a number of group numbers to apply in a given slot based on whether the frequency hopping is enabled.

15. The terminal according to claim 4, wherein the processor controls a number of group numbers to apply in a given slot based on whether the frequency hopping is enabled.

16. The terminal according to claim 5, wherein the processor controls a number of group numbers to apply in a given slot based on whether the frequency hopping is enabled.

17. The terminal according to claim 1, wherein the given sequence further corresponds to an uplink control channel format.

18. A base station for communicating with a terminal comprising:
    a receiver that receives a demodulation reference signal from the terminal; and
    a processor that determines, for the demodulation reference signal to which a given sequence corresponding to a given group is applied, the given group based on a first symbol number of the demodulation reference signal.

19. A system comprising a terminal and a base station; wherein
    the terminal comprises:
      a transmitter that transmits a demodulation reference signal to which a given sequence corresponding to a given group is applied; and
      a processor of the terminal that determines the given group based on a symbol number of the demodulation reference signal,
      wherein the processor of the terminal determines at least the given group based on a first symbol number of the demodulation reference signal, and
    the base station comprises:
      a receiver that receives the demodulation reference signal from the terminal; and
      a processor of the base station that determines, for the demodulation reference signal to which a given sequence corresponding to a given group is applied, the given group based on a first symbol number of the demodulation reference signal.

* * * * *